(12) United States Patent
Segawa et al.

(10) Patent No.: US 9,995,916 B2
(45) Date of Patent: Jun. 12, 2018

(54) VARIABLE MAGNIFICATION OPTICAL SYSTEM AND IMAGE PICKUP APPARATUS

(71) Applicant: Tamron Co., Ltd., Saitama (JP)

(72) Inventors: Toshiya Segawa, Saitama (JP); Lai Wei, Saitama (JP)

(73) Assignee: TAMRON CO., LTD., Saitama (JP)

( * ) Notice: Subject to any disclaimer, the term of this patent is extended or adjusted under 35 U.S.C. 154(b) by 0 days. days.

(21) Appl. No.: 15/587,480

(22) Filed: May 5, 2017

(65) Prior Publication Data

US 2017/0336600 A1  Nov. 23, 2017

(30) Foreign Application Priority Data

May 19, 2016  (JP) ................. 2016-100789

(51) Int. Cl.
| | |
|---|---|
| *G02B 15/14* | (2006.01) |
| *G02B 13/00* | (2006.01) |
| *G02B 15/16* | (2006.01) |
| *G02B 15/173* | (2006.01) |

(52) U.S. Cl.
CPC ........... *G02B 13/009* (2013.01); *G02B 15/16* (2013.01); *G02B 15/173* (2013.01)

(58) Field of Classification Search
CPC ..................................... G02B 13/009
USPC ......................................... 359/684
See application file for complete search history.

(56) References Cited

U.S. PATENT DOCUMENTS

| | | | |
|---|---|---|---|
| 2013/0155312 A1* | 6/2013 | Matsui | G02B 13/18 348/345 |
| 2016/0205299 A1 | 7/2016 | Imaoka | |

FOREIGN PATENT DOCUMENTS

| | | |
|---|---|---|
| JP | 2015-014678 | 1/2015 |
| JP | 2015-084038 | 4/2015 |
| JP | 2015-180044 | 10/2015 |

* cited by examiner

*Primary Examiner* — James Jones

(74) *Attorney, Agent, or Firm* — Paratus Law Group, PLLC

(57) ABSTRACT

A variable magnification optical system according to the present invention includes, in order from an object side: a first lens group having positive refractive power, a second lens group having negative refractive power, a third lens group having positive refractive power, a fourth lens group having positive refractive power, and a following lens group, wherein at least the second lens group is moved so that a gap between the first lens group and the second lens group increases and a gap between the second lens group and the third lens group decreases when zooming from a wide angle end to a telephoto end, and a predetermined conditional expression is satisfied.

12 Claims, 37 Drawing Sheets

VARIABLE MAGNIFICATION OPTICAL SYSTEM AND IMAGE PICKUP APPARATUS

CROSS-REFERENCE TO RELATED APPLICATIONS

This application is based on and claims the benefit of priority from Japanese Patent Application No. 2016-100789, filed on May 19, 2016, the whole contents of which are incorporated herein by reference.

BACKGROUND OF THE INVENTION

Technical Field

The present invention relates to a variable magnification optical system and an image pickup apparatus and particularly to a variable magnification optical system suitable for an image pickup apparatus such as digital still cameras and digital video cameras and an image pickup apparatus using solid-state image sensors such as CCD and CMOS.

Related Art

Conventionally, image pickup apparatuses using solid-state image sensors such as digital still cameras and digital video cameras have been widely used. As an optical system used in such an linage pickup apparatus, a variable magnification optical system capable of changing a focal length is widely used. The variable magnification optical system is also widely adopted as an optical system of a surveillance image pickup apparatus. If a variable magnification optical system having a high zooming ratio is used, the focal length can be adjusted according to a surveillance area or the like. Accordingly, it is easy to respond to various needs. Further, since the surveillance image pickup apparatus is used at all times, a bright variable magnification optical system having a large aperture is required. This is because the variable magnification optical system having a large aperture can obtain clear subject images even in the time zone in which the light amount is not enough.

In addition, in recent years, a variable magnification optical system capable of coping with a resolution higher than that of a full high-definition has been demanded as the number of pixels and the sensitivity of a solid-state image sensor are increased. Furthermore, since there is a great demand for miniaturization of the surveillance image pickup apparatus, miniaturization of the variable magnification optical system is also strongly demanded.

As the conventional variable magnification optical systems, for example, JP 2015-14678 A proposes a zoom lens including a first lens group having positive refractive power, a second lens group having negative refractive power, a third lens group having positive refractive power, a fourth lens group having positive refractive power, a fifth lens group having negative refractive power, and a sixth lens group having positive refractive power in order from an object side, wherein the first lens group is fixed and the second lens group to the fifth lens group are respectively moved along different loci to focus from a wide angle end to a telephoto end. In the zoom lens, since the absolute value of the lateral magnification of the second lens group at the telephoto end is large, a high zooming ratio is achieved. However, in the zoom lens, the lateral magnification change of the second lens group from the wide angle end to the telephoto end is small and sufficient miniaturization is not easily achieved.

JP 2015-84038 A proposes a zoom lens including a first lens group having positive refractive power, a second lens group having negative refractive power, a third lens group having positive refractive power, a fourth lens group, a fifth lens group, and a sixth lens group in order from an object side, wherein a gap between the lens groups is changed to zoom from a wide angle end to a telephoto end. In the zoom lens, various aberrations are corrected satisfactorily by setting four or more lens groups as movable groups during zooming. However, since the absolute value of the lateral magnification of the second lens group at the telephoto end is small, it is difficult to achieve a high zooming ratio.

JP 2015-180044 A proposes a dome camera that accommodates a zoom lens in a rotatable camera body. In the zoom lens, since the absolute value of the lateral magnification of the second lens group at the telephoto end is large, a high zooming ratio is achieved. Further, since the dome camera includes a correction optical system and at least one of tilting, eccentric moving, and rotating is performed in accordance with the movement angle of the camera body, deterioration in image quality can be suppressed. However, in the zoom lens, the lateral magnification change of the second lens group from the wide angle end to the telephoto end is small and sufficient miniaturization is not easily obtained.

SUMMARY OF THE INVENTION

An object of the present invention is to provide a compact variable magnification optical system and an image pickup apparatus having a high zooming ratio and good optical performance over the whole zooming range.

In order to achieve the above-described object, according to the present invention, there is provided a variable magnification optical system including, in order from an object side: a first lens group having positive refractive power; a second lens group having negative refractive power; a third lens group having positive refractive power; a fourth lens group having positive refractive power; and a following lens group, wherein at least the second lens group is moved so that a gap between the first lens group and the second lens group increases and a gap between the second lens group and the third lens group decreases when zooming from a wide angle end to a telephoto end, and a following conditional expression (1) and a conditional expression (2) are satisfied.

$$3.0 < |m2/f2| < 12.0 \quad (1)$$

$$0.45 < (\beta 2t/\beta 2w)/(Ft/Fw) < 1.0 \quad (2)$$

Here,
m2 is a movement amount of the second lens group in an optical axis direction when zooming from the wide angle end to the telephoto end,
f2 is a focal length of the second lens group,
$\beta 2w$ is a lateral magnification of the second lens group at the wide angle end,
$\beta 2t$ is a lateral magnification of the second lens group at the telephoto end,
Fw is a focal length of the whole variable magnification optical system at the wide angle end, and
Ft is a focal length of the whole variable magnification optical system at the telephoto end.

Further, in order to achieve the above-described object, according to the present invention, there is provided an image pickup apparatus including: the variable signification optical system according to the present invention; and an image sensor disposed on an image side of the variable magnification optical system and converting an optical image formed by the variable magnification optical system into an electric signal.

According to the present invention, it is possible to provide a compact, variable magnification optical system and an image pickup apparatus having a high zooming ratio and good optical performance over the whole zooming range.

DESCRIPTION OF THE EMBODIMENTS

Figure 1:
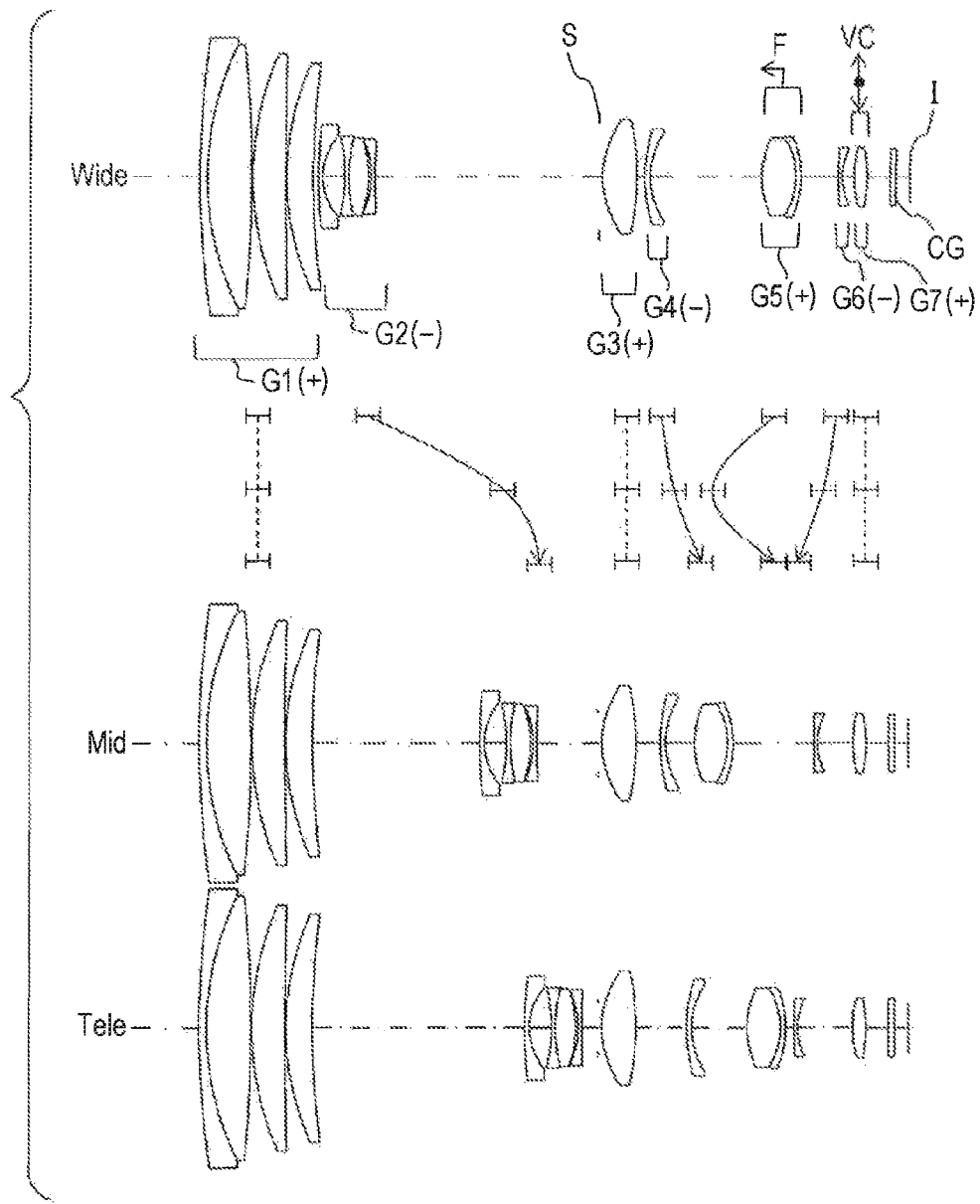
FIG. 1 is a cross-sectional view showing an example of a lens configuration of a variable magnification optical system of Example 1 of the present invention, where an upper stage indicates a wide angle end focused state, a middle stage indicates a middle focus position focused state, and a lower stage indicates a telephoto end focused state.

Hereinafter, an embodiment of a variable magnification optical system and an image pickup apparatus according to the present invention will be described. Here, the variable magnification optical system and the image pickup apparatus to be described below are one aspect of the variable magnification optical system and the image pickup apparatus according to the present invention and the variable magnification optical system according to the present invention is not limited to the following aspect.

1. Variable Magnification Optical System 1-1. Configuration of Variable Magnification Optical System First, an embodiment of a variable magnification optical system according to the present invention will be described. The variable magnification optical system according to the present invention includes a first lens group having positive refractive power, a second lens group having negative refractive power, a third lens group having positive refractive power, a fourth lens group having positive refractive power, and a following lens group disposed in order from an object side. When zooming from a wide angle end to a telephoto end, at least the second lens group is moved so that a gap between the first lens group and the second lens group increases and a gap between the second lens group and the third lens group decreases and a predetermined conditional expression to be described later is satisfied. First, the configuration of the optical system according to the present invention will be described and the matters concerning the conditional expression will be described later. When the above-described configuration is adopted and the predetermined conditional expression is satisfied, it is possible to provide a compact variable magnification optical system having a high zooming ratio and good optical performance over the whole zooming range.

(1) First Lens Group

As long as the first lens group has positive refractive power as a whole, its detailed lens configuration is not particularly limited. Further, the operation of the first lens group at the time of zooming from the wide angle end to the telephoto end is also not particularly limited and the first lens group may be a fixed group fixed in the optical axis direction or a moving group moving in the optical axis direction. However, it is desirable to fix the first lens group in the optical axis direction when zooming from the wide angle end to the telephoto end from the viewpoint of easily decreasing the size and the weight of the variable magnification optical system as a whole. In the variable magnification optical system, since the first lens group includes a lens having a large outer diameter compared to the other lens groups and many positive lenses, the first lens group is heavy. For that reason, when the first lens group is made to be a fixed group at the time of zooming, it is possible to easily decrease the size and the weight of the moving mechanism for moving the lens group at the time of zooming and thus to easily decrease the size and the weight of the whole variable magnification optical system.

(2) Second Lens Group

As long as the second lens group has negative refractive power as a whole, its detailed lens configuration is not particularly limited. When zooming from the wide angle end to the telephoto end, at least the second lens group is moved so that a gap between the first lens group and the second lens group increases and a gap between the second lens group and the third lens group decreases. In the variable magnification optical system, the second lens group serves as a variator and the second lens group is moved to change the focal length of the variable signification optical system. The movement direction of the second lens group is not particularly limited, but when the first lens group is fixed in the optical axis direction at the time of zooming, the second lens group is moved toward the image side.

(3) Third Lens Group

As long as the third lens group has positive refractive power as a whole, its detailed lens configuration is not particularly limited. Further, the operation of the third lens group when zooming from the wide angle end to the telephoto end is not also particularly limited and the third lens group may be a fixed group fixed in the optical axis direction or a moving group moving in the optical axis direction. However, since the moving mechanism for moving the third lens group at the time of zooming is not needed when the third lens group is the fixed group, it is desirable that the third lens group be the fixed group in order to decrease the size and the weight of the whole variable magnification optical system.

(4) Fourth Lens Group

As long as the fourth lens group has positive refractive power as a whole, its detailed lens configuration is not particularly limited. Further, the operation of the fourth lens group when zooming from the wide angle end to the telephoto end is not also particularly limited and the fourth lens group may be a fixed group fixed in the optical axis direction or a moving group moving in the optical axis direction. However, when the fourth lens group is the moving group, the zooming action can be shared by the second lens group and the fourth lens group. It is possible to suppress a change in aberration at the time of zooming compared to the case where only the second lens group is provided with the zooming action. For this reason, since aberration correction can be satisfactorily performed with a small number of lenses, it is possible to easily achieve a high-resolution variable magnification optical system in a compact size.

(4) Following Lens Group

A detailed lens group configuration of the following lens group is not particularly limited. The following lens group may include only one lens group or a plurality of lens groups. Further, when the following lens group includes one lens group or a plurality of lens groups, a detailed configuration of each of the lens groups is not particularly limited. Additionally, in the following lens group, the lens group which is disposed closest to the object side will be referred to as a fifth lens group.

The operation of the following lens group when zooming from the wide angle end to the telephoto end is also not particularly limited and the following lens group may be a fixed group fixed in the optical axis direction or a moving group moving in the optical axis direction. Further, when the following lens group includes a plurality of lens groups, each of the lens groups may be a fixed group or a moving group. However, it is desirable that the fifth lens group be the moving group from the viewpoint of more easily obtaining good optical performance over the whole zooming range even when a high zooming ratio is achieved.

When the following lens group includes a plurality of lens groups, for example, a fifth lens group having negative refractive power and a sixth lens group having positive refractive power disposed in order from the object side may be provided. According to this configuration, it is possible to miniaturize the variable magnification optical system and to achieve good optical performance over the whole zooming range even when a high zooming ratio is achieved. In this case, the other lens groups such as a seventh lens group having positive or negative refractive power may be provided on the image side of the sixth lens group.

(5) Aperture Stop

The arrangement of the aperture stop in the variable magnification optical system according to the present invention is not particularly limited. However, it is desirable to provide the aperture stop at the third lens group from the viewpoint of miniaturizing the variable magnification optical system and achieving brighter and better optical performance. Providing the aperture stop at the third lens group means that the aperture stop is disposed, on the most object side of the third lens group, in the third lens group, or on the image side of the third lens group.

(6) Focusing Group

It is desirable to perform focusing from infinity to a close object using the entirety or a part of the following lens group as the focusing group in the variable magnification optical system. When the first lens group to the fourth lens group of the variable magnification optical system are compared with each other, the following lens group can be decreased in size and weight. For that reason, the focusing group can be decreased in size and weight when the entirety or a part of the following lens group is used as the focusing group. For that reason, it is possible to perform a quick focusing operation. Further, since the focusing group can be decreased in size and weight, the driving mechanism for moving the focusing group can be easily decreased in size and weight, the whole variable magnification optical system can be easily decreased in size and weight.

(6) Vibration-Compensation Lens Group

Among the lens groups constituting the variable magnification optical system, any one of the lens groups or a part of the lens group may be configured as a vibration-compensation lens group moving in a direction perpendicular to the optical axis to correct the image blur at the time of imaging.

1-2. Conditional Expression

Next, conditions to be satisfied by the variable magnification optical system or conditions that are preferably satisfied will be described.

The variable magnification optical system satisfies the following conditional expression (1) and the conditional expression (2).

$$3.0 < |m2/f2| < 12.0 \quad (1)$$

$$0.45 < (\beta 2t/\beta 2w)/(Ft/Fw) < 1.0 \quad (2)$$

Here, m2 is a movement amount, of the second lens group in the optical axis direction when zooming from the wide angle end to the telephoto end, f2 is a focal length of the second lens group, β2w is a lateral magnification of the second lens group at the wide angle end, β2t is a lateral magnification of the second lens group at the telephoto end, Fw is a focal length of the whole variable magnification optical system at the wide angle end, and Ft is a focal length of the whole variable magnification optical system at the telephoto end.

1-2-1. Conditional Expression (1)

The conditional expression (1) defines a ratio between the movement amount and the focal length of the second lens group. When the conditional expression (1) is satisfied, it is possible to miniaturize the variable magnification optical system and to achieve good optical performance over the entire zooming range even when a high zooming ratio is achieved.

On the contrary, when the numerical value of the conditional expression (1) becomes the upper limit value or more, the refractive power of the second lens group becomes strong and thus the field curvature and the astigmatism cannot be easily corrected. For that reason, it is difficult to keep good optical performance over the whole zooming range. Meanwhile, when the numerical value of the conditional expression (1) becomes the lower limit value or less, the refractive power of the second lens group becomes weak and thus the high zooming ratio and the miniaturization of the variable magnification optical system cannot be easily achieved.

In order to obtain these effects, it is desirable that the upper limit value of the conditional expression (1) be 9.0. Further, it is desirable that the lower limit value of the conditional expression (1) be 3.0.

1-2-2. Conditional Expression (2)

The conditional expression (2) defines a relation between the lateral magnification of the second lens group at the wide angle end and the telephoto end and the focal length of the whole variable magnification optical system. When the conditional expression (2) is satisfied, it is possible to miniaturize the variable magnification optical system even when a high zooming ratio is achieved and thus to obtain the variable magnification optical system having better optical performance.

On the contrary, when the numerical value of the conditional expression (2) becomes the upper limit value or more, the refractive power of the second lens group becomes strong and thus the field curvature and the astigmatism cannot be easily corrected. For that reason, it is difficult to keep good optical performance over the whole zooming range. Meanwhile, when the numerical value of the conditional expression (2) becomes the lower limit value or less, the refractive power of the second lens group becomes weak and thus the high zooming ratio and the miniaturization of the variable magnification optical system cannot be easily achieved.

1-2-3. Conditional Expression (3)

It is desirable that the variable magnification optical system satisfy the following conditional expression (3).

$$3.0 < |\beta 2t| < 9.0 \tag{3}$$

The conditional expression (3) defines the lateral magnification of the second lens group at the telephoto end. When the conditional expression (3) is satisfied, it is possible to more easily miniaturize the variable magnification optical system while achieving a high zooming ratio.

On the contrary, when the numerical value of the conditional expression (3) becomes the upper limit value or more, the refractive power of the second lens group becomes strong and thus the field curvature and the astigmatism cannot be easily corrected. For that reason, it is difficult to keep good optical performance over the whole zooming range. Meanwhile, when the numerical value of the conditional expression (3) becomes the lower limit value or less, the refractive power of the second lens group becomes too weak and thus the high zooming ratio and the miniaturization of the variable magnification optical system cannot be easily achieved.

In order to obtain these effects, it is desirable that the upper limit value of the conditional expression (3) be 8.5. Further, it is desirable that the lower limit value of the conditional expression (3) be 3.0.

1-2-4. Conditional Expression (4)

It is desirable that the variable magnification optical system satisfy the following conditional expression (4).

$$0.08 < |f4/Ft| < 0.3 \tag{4}$$

Here, f4 is a focal length of the fourth lens group.

The conditional expression (4) defines a ratio between the focal length of the fourth lens group and the focal length of the whole variable magnification optical system at the telephoto end. When the conditional expression (4) is satisfied, the spherical aberration and the field curvature occurring in the following lens group can be suppressed and thus the variable magnification optical system having a high resolution over the whole zooming range can be obtained.

On the contrary, when the numerical value of the conditional expression (4) becomes the upper limit value or more, the refractive power of the fourth lens group becomes too weak and thus the high zooming ratio and the miniaturization of the variable magnification optical system cannot be easily achieved. Meanwhile, when the numerical value of the conditional expression (4) becomes the lower limit value or less, the refractive power of the second lens group becomes strong and thus the spherical aberration and the field curvature cannot be easily corrected. For that reason, it is difficult to keep good optical performance over the whole zooming range.

In order to obtain these effects, it is desirable that the upper limit value of the conditional expression (4) be 0.25, Further, it is desirable that the lower limit value of the conditional expression (4) be 0.09.

1-2-5. Conditional Expression (5)

It is desirable that the fifth lens group disposed closest to the object side in the following lens group of the variable magnification optical system satisfy the following conditional expression (5).

$$0.08 < |f5/Ft| < 0.3 \tag{5}$$

Here, f5 is a focal length of the fifth lens group.

The conditional expression (5) defines a ratio between the focal length of the fifth lens group and the focal length of the whole variable magnification optical system at the telephoto end. When the conditional expression (5) is satisfied, the spherical aberration and the field curvature occurring in the following lens group can be suppressed and thus the variable magnification optical system having a high resolution over the whole zooming range can be obtained.

On the contrary, when the numerical value of the conditional expression (5) becomes the upper limit value or more, the refractive power of the fifth lens group becomes too weak and thus the high zooming ratio and the miniaturization of the variable magnification optical system cannot be easily achieved. Meanwhile, when the numerical value of the conditional expression (5) becomes the lower limit value or less, the refractive power of the second lens group becomes strong and thus the spherical aberration and the field curvature cannot be easily corrected. For that reason, it is difficult to keep good optical performance over the whole zooming range.

In order to obtain these effects, it is desirable that the upper limit value of the conditional expression (5) be 0.25. Further, it is desirable that the lower limit value of the conditional expression (5) be 0.09.

1-2-6. Conditional Expression (6)

It is desirable that the variable magnification optical system satisfy the following conditional expression (6).

$$0.3 < TTL/Ft < 0.8 \qquad (6)$$

Here,

Ft is a focal length of the whole variable magnification optical system at the telephoto end, and TTL is a whole length of the whole variable magnification optical system at the telephoto end.

The conditional expression (6) defines a ratio between the whole length of the whole variable magnification optical system and the focal length of the variable magnification optical system at the telephoto end. When the conditional expression (6) is satisfied, the miniaturization in the whole length direction can be achieved even when a high zooming ratio is achieved. Further, when the conditional expression (6) is satisfied, the field curvature or the axial chromatic aberration can be satisfactorily corrected and thus good optical performance can be achieved over the whole zooming range.

When the numerical value of the conditional expression (6) becomes the upper limit value or more, the whole length of the whole variable magnification optical system becomes long in the case of the variable magnification optical system having a high zooming ratio and thus the compact variable magnification optical system cannot be easily achieved. Meanwhile, when the numerical value of the conditional expression (6) becomes the lower limit value or less, the field curvature or the axial chromatic aberration cannot be easily corrected and thus good optical performance over the whole zooming range cannot be easily kept.

In order to obtain these effects, the upper limit value of the conditional expression (6) is desirably 0.78 and more desirably 0.75. As the upper limit value of the conditional expression (6) decreases, it is possible to more easily miniaturize the variable magnification optical system even when a high zooming ratio is achieved. Meanwhile, the lower limit value of the conditional expression (6) is desirably 0.35 and more desirably 0.40. As the lower limit value of the conditional expression (6) increases, the field curvature or the axial chromatic aberration can be easily corrected and thus good optical performance over the whole zooming range can be more easily kept.

2. Image Pickup Apparatus

Next, an image pickup apparatus according to the present invention will be described. The image pickup apparatus according to the present invention includes the variable magnification optical system according to the present invention and an image sensor which is provided on the image plane side of the variable magnification optical system and electrically converts an optical image formed by the variable magnification optical system into an electric signal.

Here, the image sensor or the like is not particularly limited and solid-state image sensors such as a Charge Coupled Device (CCD) sensor or a Complementary Metal Oxide Semiconductor (CMOS) sensor can be used. The image pickup apparatus according to the present invention is suitable for an image pickup apparatus using a solid-state image sensor such as digital cameras and digital video cameras. Of course, the image pickup apparatus may be a fixed lens image pickup apparatus in which a lens is fixed to a casing or may be a lens interchangeable image pickup apparatus such as a single lens reflex camera or a mirrorless camera.

Figure 37:
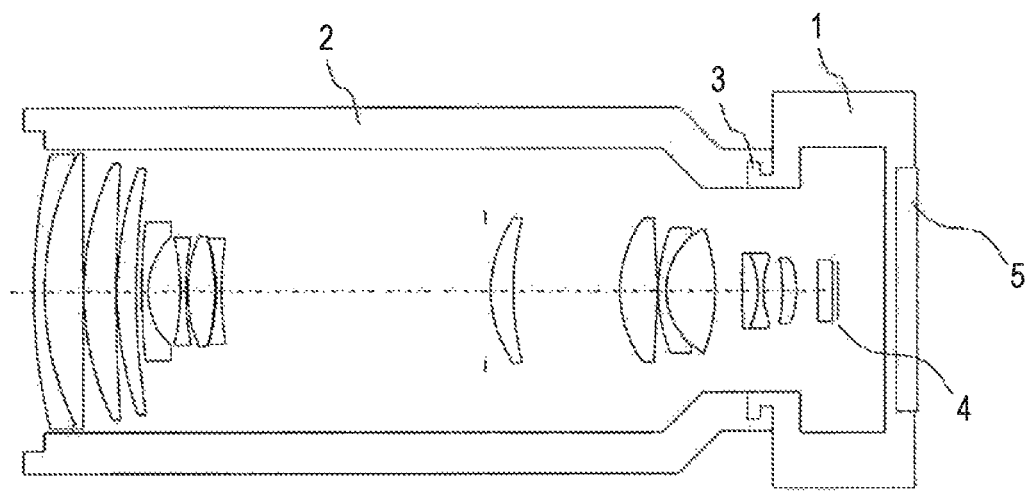
FIG. 37 is a schematic diagram showing an example of an image pickup apparatus according to the present invention.

A detailed configuration example is shown in FIG. 37. FIG. 37 is a diagram schematically showing a cross-section of a lens interchangeable image pickup apparatus 1. As shown in FIG. 37, the lens interchangeable image pickup apparatus 1 has a configuration in which a mirror part 2 accommodating a variable magnification optical system is removably attached to a mounting part 3 of the image pickup apparatus 1. The image pickup apparatus 1 includes an image sensor 4 on the image side of the variable magnification optical system and forms an optical image on an image pickup plane of the image sensor 4 by the variable magnification optical system. The optical image formed on the image pickup plane is converted into an electrical signal in the image sensor 4. Image data which is generated based on the electric signal is output to an image output device such as a back monitor 5 provided at the rear surface of the image pickup apparatus 1.

The variable magnification optical system according to the present invention has high resolution and high optical performance over the whole zooming range. Further, the variable magnification optical system can be provided in a compact size while achieving a high zooming ratio. For that reason, even when the number of pixels of the image sensor 4 is high and the sensitivity thereof is high, it is possible to obtain a subject image with a clear contour. For that reason, the image pickup apparatus including the variable magnification optical system according to the present invention is suitable for an application of enlarging a part of an image and confirming details of the subject, for example, a surveillance image pickup apparatus.

In addition, the variable magnification optical system of the present invention means a variable focus lens having a variable focal length such as a zoom lens and a varifocal lens.

Next, the present invention will be described specifically by showing examples. Here, the present invention is not limited to the following examples. The optical system according to each of the examples described below is an image pickup optical system used for an image pickup apparatus (optical apparatus) such as a digital camera, a video camera, and a silver salt film camera, and in particular, an installation type image pickup apparatus such as a surveillance image pickup apparatus. Further, in the cross-sectional view of each lens, the left side is the object side and the right side is the image plane side in the drawing.

Example 1

(1) Configuration of Optical System

FIG. 1 shows a lens configuration in a wide angle end state (Wide), a middle focus position state (Mid), and a telephoto end state (Tele) of a zoom lens which is an optical system of Example 1 according to the present invention. In the drawing, the locus of each lens group at the time of zooming is indicated by an arrow.

The zoom lens of Example 1 includes a first lens group G1 having positive refractive power, a second lens group G2 having negative refractive power, a third lens group G3 having positive refractive power, a fourth lens group G4 having negative refractive power, a fifth lens group G5 having positive refractive power, a sixth lens group G6 having negative refractive power, and a seventh lens group G7 having positive refractive power in order from an object side. A detailed lens configuration is shown in FIG. 1.

Further, in FIG. 1, "CG" is a parallel flat plate having no substantial refractive power such as a cover glass. Further, [I] is an image plane, specifically, an image pickup plane of a solid-state image sensor such as a CCD sensor, a CMOS sensor, or the like or a film surface of a silver halide film. Since these points are the same in the cross-sectional view of each lens shown in other examples, the description thereof will be omitted below.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the image side, the fifth lens group G5 is moved along a locus protruding toward the object side, the sixth lens group G6 is moved toward the object side, and the seventh lens group G7 is fixed in the optical axis direction. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4, the fifth lens group G5, and the sixth lens group G6 respectively serve as compensators.

Further, in the zoom lens, when focusing from the infinite object to the close object, the fifth lens group G5 is moved along the optical axis toward the object side for the focusing operation. Further, the seventh lens group G7 is configured to be movable in a direction perpendicular to the optical axis and serves as a vibration-compensation lens group VC that corrects image blurring at the time of the image pickup operation.

(2) Numerical Example

Next, numerical examples which adopt detailed numerical values of the zoom lens will be described. Table 1 shows surface data of the zoom lens. In Table 1, "surface number" indicates the order of the lens surfaces counted from the object side, "r" indicates the curvature radius of the lens surface, "d" indicates the gap between the lens surfaces on the optical axis, "nd" indicates the refractive index with respect to the d line (a wavelength of λ=587.56 nm), and "vd" indicates the Abbe number with respect to the d line. Further, the asterisk "*" next to the surface number indicates that the lens surface is an aspherical surface and "S" indicates the aperture stop. Further, D(7) and the like indicate that the gap between the lens surfaces on the optical axis is changeable upon zooming.

Table 2 shows aspherical data. The aspherical data shows a conic coefficient and an aspherical coefficient of each order when an aspherical surface is defined by the following expression.

$$z=ch^2/[1+(1-(1+k)c^2h^2)^{1/2}]+A4h^4+A6h^6+A8h^8+A10h^{10}$$

Here, c is the curvature (1/r), h is a height from the optical axis, k is a conic coefficient, and A4, A6, A8, A10, and the like are aspherical coefficients of the respective orders.

Table 3 shows various data. Various data indicate various data at the wide angle end, the middle focus position, and the telephoto end. In the table, "F" indicates a focal length (mm) of the zoom lens at the time of focusing on infinity, "Fno." indicates an F-number of the zoom lens, "ω" indicates a half field angle (°) of the optical system, and D(7) and the like indicate a variable gap between the lens surfaces. Table 4 shows the focal lengths of the lens groups.

Further, Table 37 shows the numerical values of the conditional expression (1) to the conditional expression (6) of the zoom lens. Since the matters relating to these tables are the same in the tables shown in the other examples, the description thereof will be omitted below.

Figure 2:
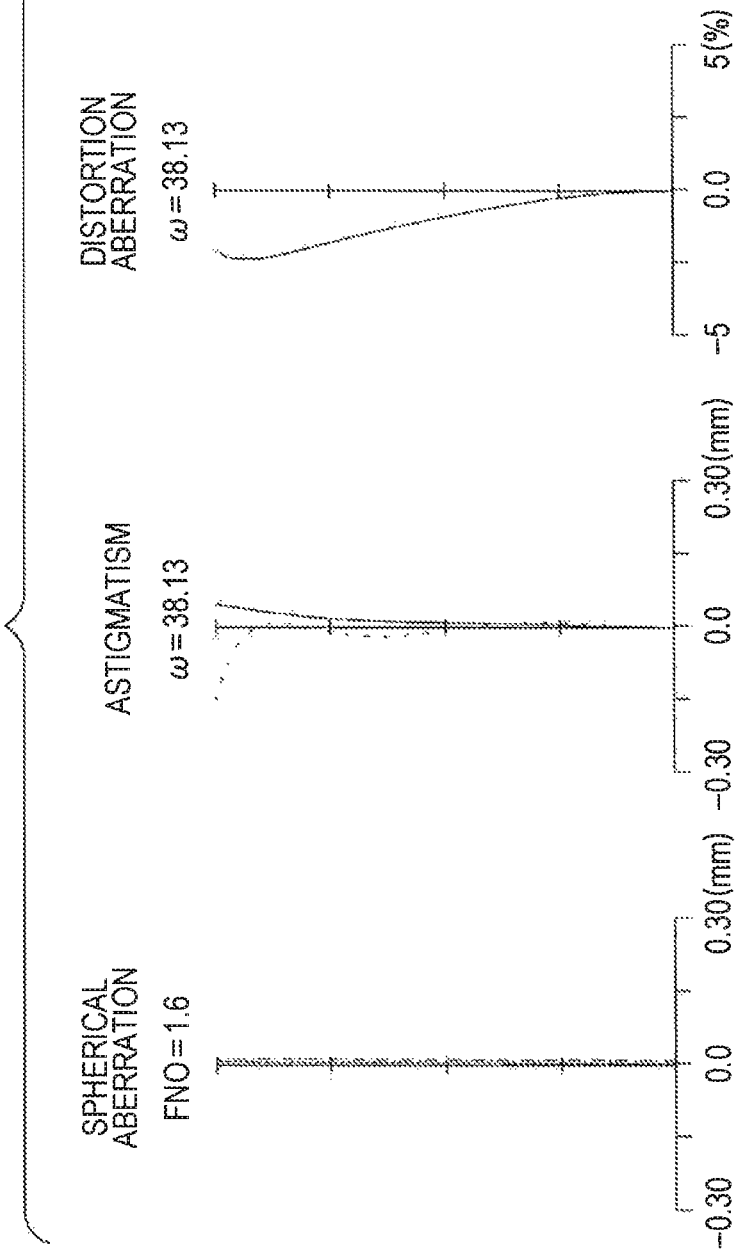
FIG. 2 shows a spherical aberration diagram, an astigmatism diagram, and a distortion aberration diagram at the time of focusing on infinity in the wide angle end focused state of the variable magnification optical system of Example 1.
Figure 3:
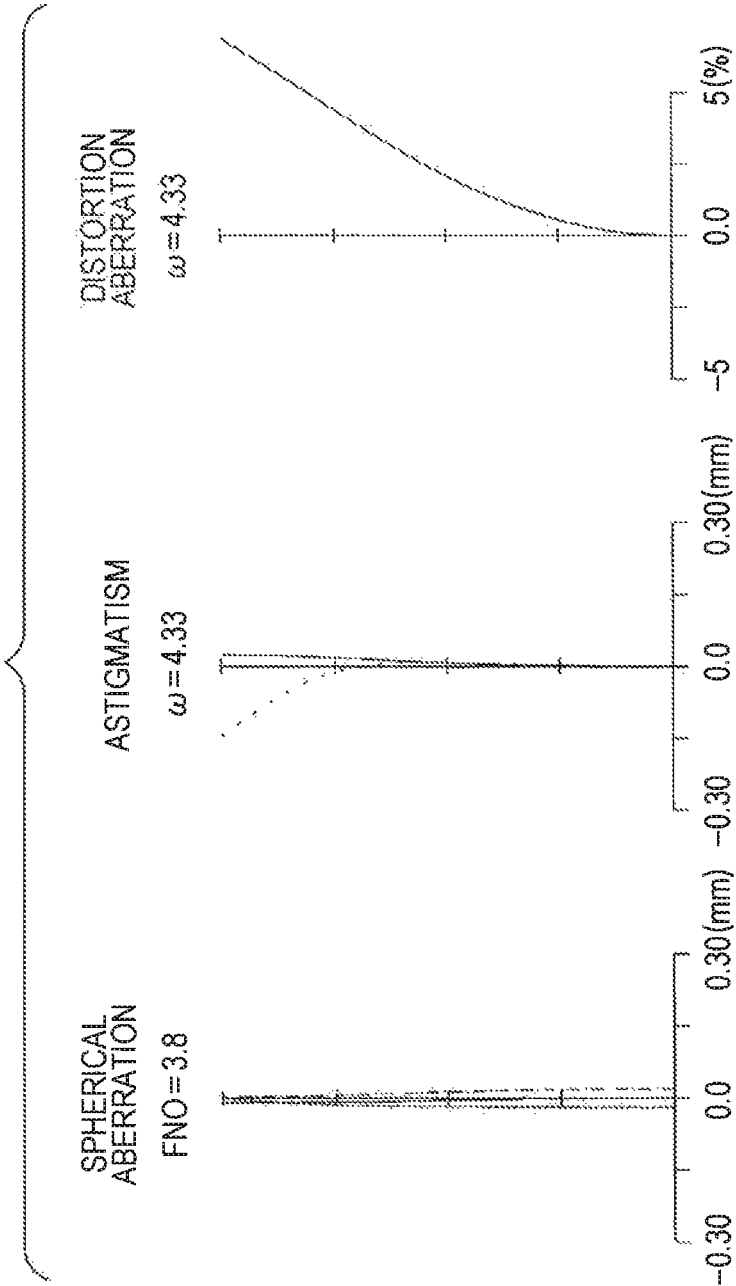
FIG. 3 shows a spherical aberration diagram, an astigmatism diagram, and a distortion aberration diagram at the time of focusing on infinity in the middle focus position focused state of the variable magnification optical system of Example 1.
Figure 4:
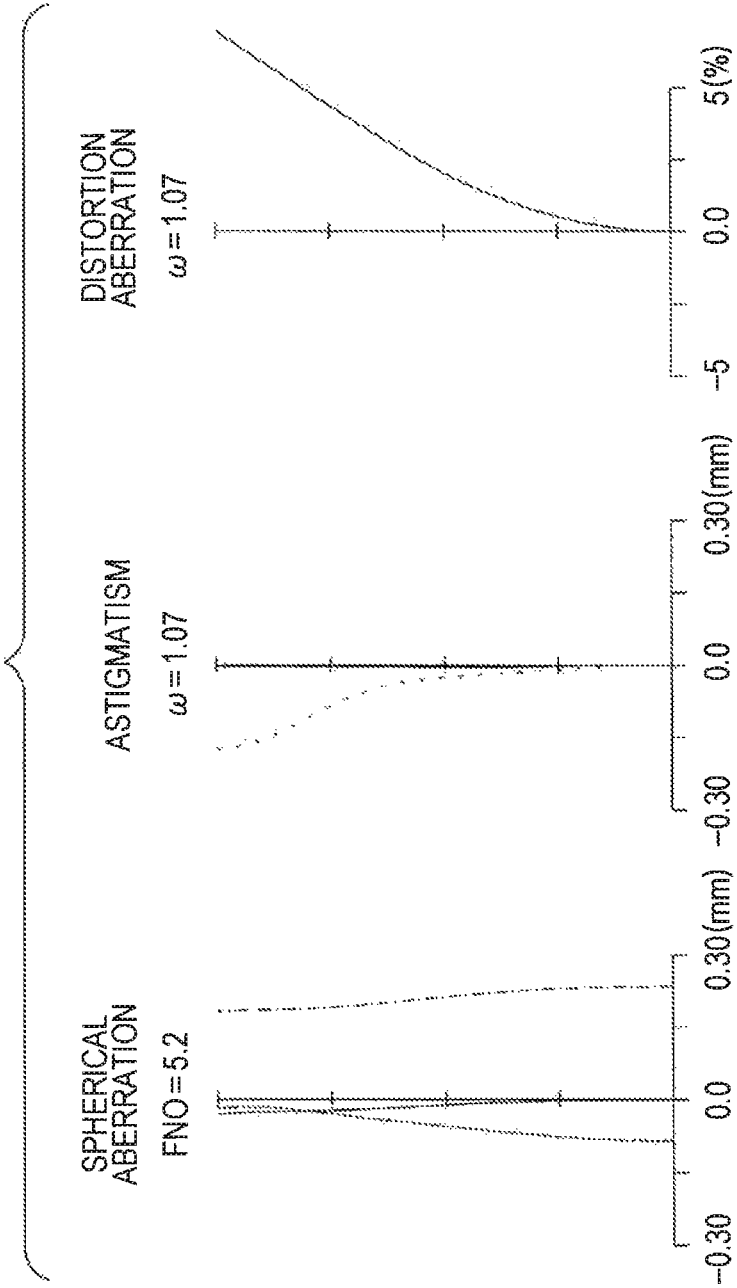
FIG. 4 shows a spherical aberration diagram, an astigmatism diagram, and a distortion aberration diagram at the time of focusing on infinity in the telephoto end focused state of the variable magnification optical system of Example 1.

Further, FIGS. 2 to 4 respectively show the vertical aberration diagrams at the time of focusing on infinity in the wide angle end, the middle focus position, and the telephoto end of the zoom lens of Example 1. In the vertical aberration diagram of the drawings, the spherical aberration (mm), the astigmatism (mm), and the distortion aberration (%) are shown in order toward the left side of the drawing.

In the spherical aberration diagram, the vertical axis indicates an F number (which is indicated by "FNO" in the drawing), the solid line indicates a d line (a wavelength of 587.56 nm), the dash-dot line indicates a C line (a wavelength of 656.27 nm), and the dashed line indicates an F line (a wavelength of 486.13 nm).

In the astigmatism diagram, the vertical axis indicates a half field angle (ω), the solid line indicates a characteristic of a sagittal image plane (ds) with respect to the d line (a wavelength of 587.56 nm), and the dotted line indicates a characteristic of a meridional image plane (dm) with respect to the d line.

In the distortion aberration diagram, the vertical axis indicates a half field angle (ω) and indicates a characteristic at the d line (a wavelength of 587.56 nm).

Since the matters relating to these vertical aberration diagrams are the same in the vertical aberration diagrams shown in the other examples, the description thereof will be omitted below.

TABLE 1

| [SURFACE DATA] | | | | |
|---|---|---|---|---|
| SURFACE NUMBER | r | d | nd | vd |
| 1 | 124.284 | 1.000 | 2.00100 | 29.13 |
| 2 | 39.583 | 5.900 | 1.49700 | 81.61 |
| 3 | −172.116 | 0.150 | | |
| 4 | 39.963 | 4.400 | 1.49700 | 81.61 |
| 5 | 565.612 | 0.150 | | |
| 6 | 37.130 | 3.500 | 1.80420 | 46.50 |
| 7 | 114.582 | D(7) | | |

TABLE 1-continued

[SURFACE DATA]

| SURFACE NUMBER | r | d | nd | vd |
|---|---|---|---|---|
| 8 | 69.372 | 0.600 | 2.00100 | 29.13 |
| 9 | 8.314 | 2.999 | | |
| 10 | −20.021 | 0.500 | 1.88100 | 40.14 |
| 11 | 21.984 | 2.700 | 1.95906 | 17.47 |
| 12 | −13.862 | 0.333 | | |
| 13* | −10.704 | 0.500 | 1.85135 | 40.10 |
| 14* | 300.000 | D(14) | | |
| 15 | INF | 0.500 | | S |
| 16* | 11.673 | 4.600 | 1.61881 | 63.85 |
| 17* | −30.000 | D(17) | | |
| 18 | 23.221 | 0.700 | 1.95375 | 32.32 |
| 19 | 10.652 | D(19) | | |
| 20* | 11.312 | 4.539 | 1.49710 | 81.56 |
| 21 | −9.609 | 0.700 | 2.00069 | 25.46 |
| 22 | −12.959 | D(22) | | |
| 23* | 103.802 | 0.500 | 1.82080 | 42.71 |
| 24* | 8.166 | D(24) | | |
| 25* | 22.462 | 1.799 | 1.53116 | 56.04 |
| 26* | −11.883 | 1.600 | | |
| 27 | INF | 0.800 | 1.51633 | 64.14 |
| 28 | INF | 3.300 | | |

TABLE 2

[ASPHERICAL DATA]

| SURFACE NUMBER | k | A4 | A6 | A8 | A10 |
|---|---|---|---|---|---|
| 13 | −1.7579E+00 | 5.2094E−05 | −4.4645E−06 | −3.0115E−07 | 8.4856E−09 |
| 14 | 0.0000E+00 | 1.6334E−04 | −5.4602E−06 | −1.8911E−07 | 6.8625E−09 |
| 16 | −4.2800E−01 | −6.2456E−05 | −3.2351E−07 | 1.2577E−09 | −5.0848E−12 |
| 17 | 2.6900E+00 | 3.8008E−05 | −1.6452E−07 | 2.1302E−09 | −7.8815E−12 |
| 20 | −4.8290E−01 | −1.0807E−04 | −2.6084E−07 | −3.0116E−09 | 2.0419E−10 |
| 23 | 0.0000E+00 | 2.7687E−04 | −3.2595E−05 | 9.1734E−06 | −3.1141E−08 |
| 24 | 2.2788E+00 | 2.1811E−05 | −8.2425E−05 | 2.7803E−06 | −1.8289E−07 |
| 25 | 3.9773E+00 | 1.1061E−03 | −5.3792E−05 | 3.1234E−06 | −1.2247E−07 |
| 26 | −1.2800E+01 | 4.8356E−04 | −8.7436E−06 | 8.8795E−07 | −7.8299E−08 |

TABLE 3

[VARIOUS DATA]

| | WIDE ANGLE END | MIDDLE | TELEPHOTO END |
|---|---|---|---|
| F | 4.42 | 42.00 | 170.00 |
| Fno | 1.60 | 3.80 | 5.20 |
| ω | 38.13 | 4.33 | 1.07 |
| D(7) | 0.700 | 22.697 | 28.724 |
| D(14) | 30.147 | 8.150 | 2.123 |
| D(17) | 1.037 | 3.188 | 6.817 |
| D(19) | 15.142 | 3.966 | 7.525 |
| D(22) | 5.004 | 10.928 | 1.0796 |
| D(24) | 1.7 | 4.802 | 7.4626 |

TABLE 4

[FOCAL LENGTH OF EACH LENS GROUP]

| F1 | 40.256 |
|---|---|
| F2 | −5.537 |
| F3 | 14.178 |
| F4 | −21.209 |
| F5 | 15.270 |
| F6 | −10.824 |
| F7 | 14.902 |

Example 2

(1) Configuration of Optical System

Figure 5:
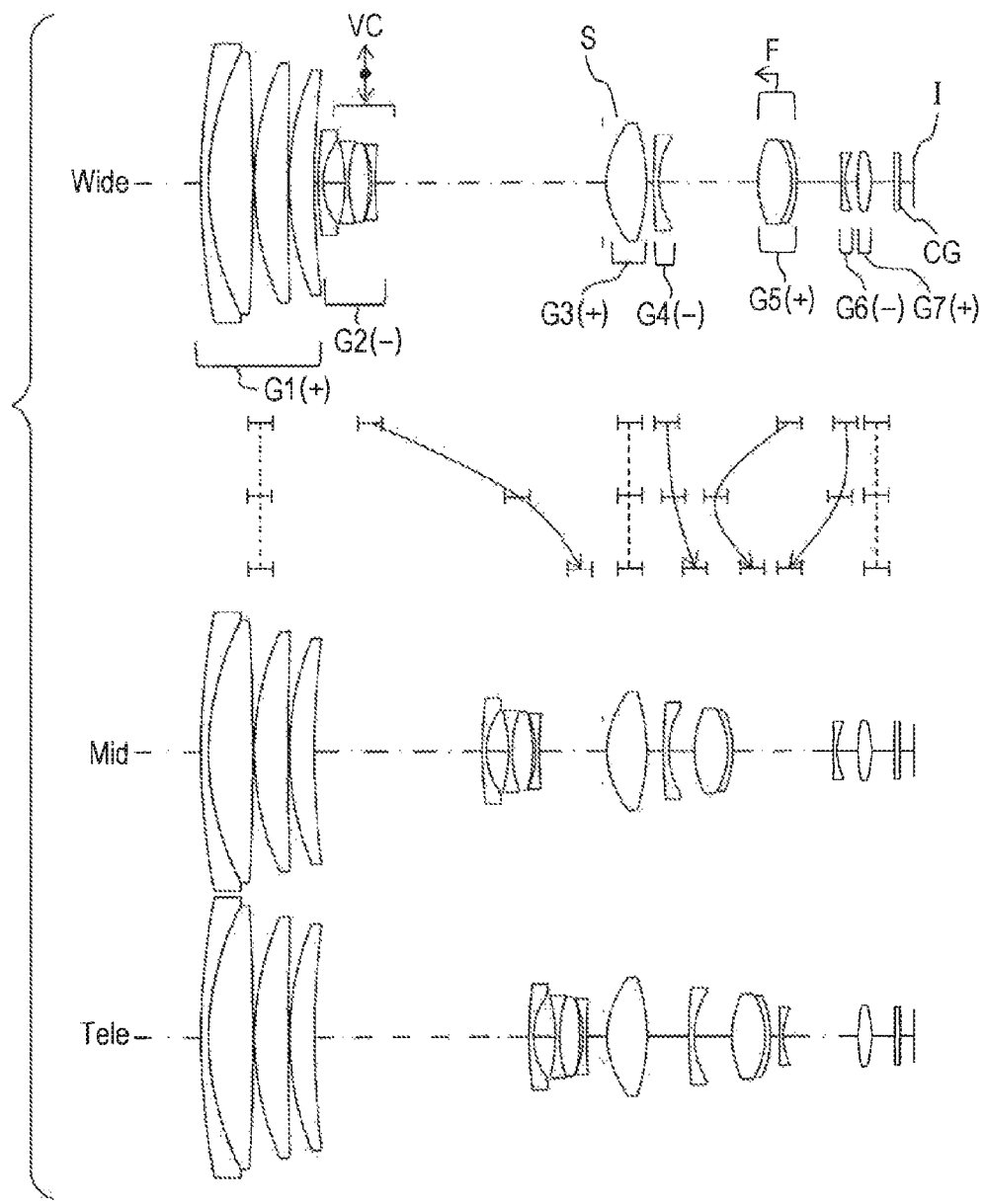
FIG. 5 is a cross-sectional view showing an example of a lens configuration of a variable magnification optical system of Example 2 of the present invention, where an upper stage indicates a wide angle end focused state, a middle stage indicates a middle focus position focused state, and a lower stage indicates a telephoto end focused state.

FIG. 5 shows a lens configuration in a wide angle end state (Wide), a middle focus position state (Mid), and a telephoto end state (Tele) of a zoom lens which is an optical system of Example 2 according to the present invention.

The zoom lens of Example 2 includes a first lens group G1 having positive refractive power, a second lens group G2 having negative refractive power, a third lens group G3 having positive refractive power, a fourth lens group G4 having negative refractive power, a fifth lens group G5 having positive refractive power, a sixth lens group G6 having negative refractive power, and a seventh lens group G7 having positive refractive power in order from an object side. A detailed lens configuration is shown in FIG. 5.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the image side, the fifth lens group G5 is moved along a locus protruding toward the object side, the sixth lens group G6 is moved toward the object side, and the seventh lens group G7 is fixed in the optical axis direction. Further, the aperture stop S is disposed on the object side of the third lens group G3 and the aperture stop S is fixed in the optical, axis direction together with the third lens group G3 upon zooming. Additionally, the second lens group G2 is a variator and the fourth lens group G4, the fifth lens group G5, and the sixth lens group G6 respectively serve as compensators.

Further, in the zoom lens, when focusing from the infinite object to the close object, the fifth lens group G5 is moved to the object side along the optical axis for the focusing operation. Further, the second lens group G2 is configured to be movable in a direction perpendicular to the optical axis and serves as a vibration-compensation lens group VC that corrects image blurring at the time of the image pickup operation.

(2) Numerical Example

Figure 6:
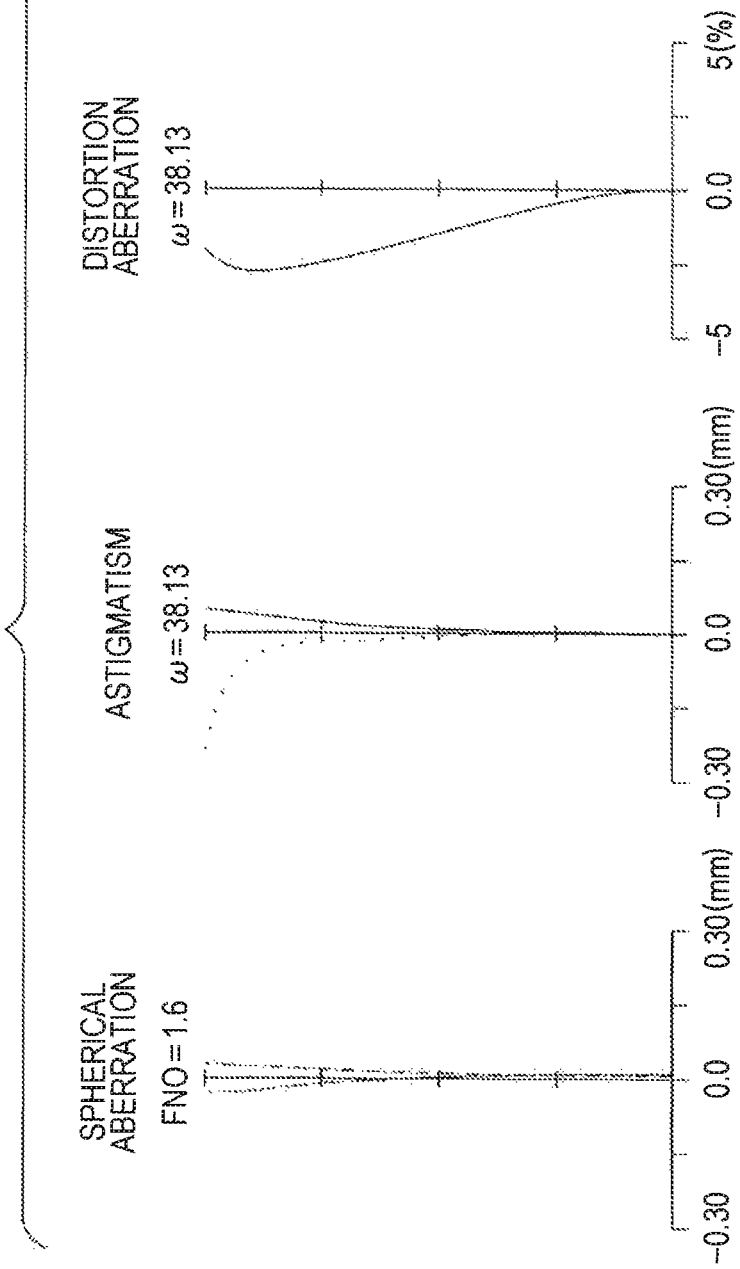
FIG. 6 shows a spherical aberration diagram an astigmatism diagram, and a distortion aberration diagram at the time of focusing on infinity in the wide angle end focused state of the variable magnification optical system of Example 2.
Figure 7:
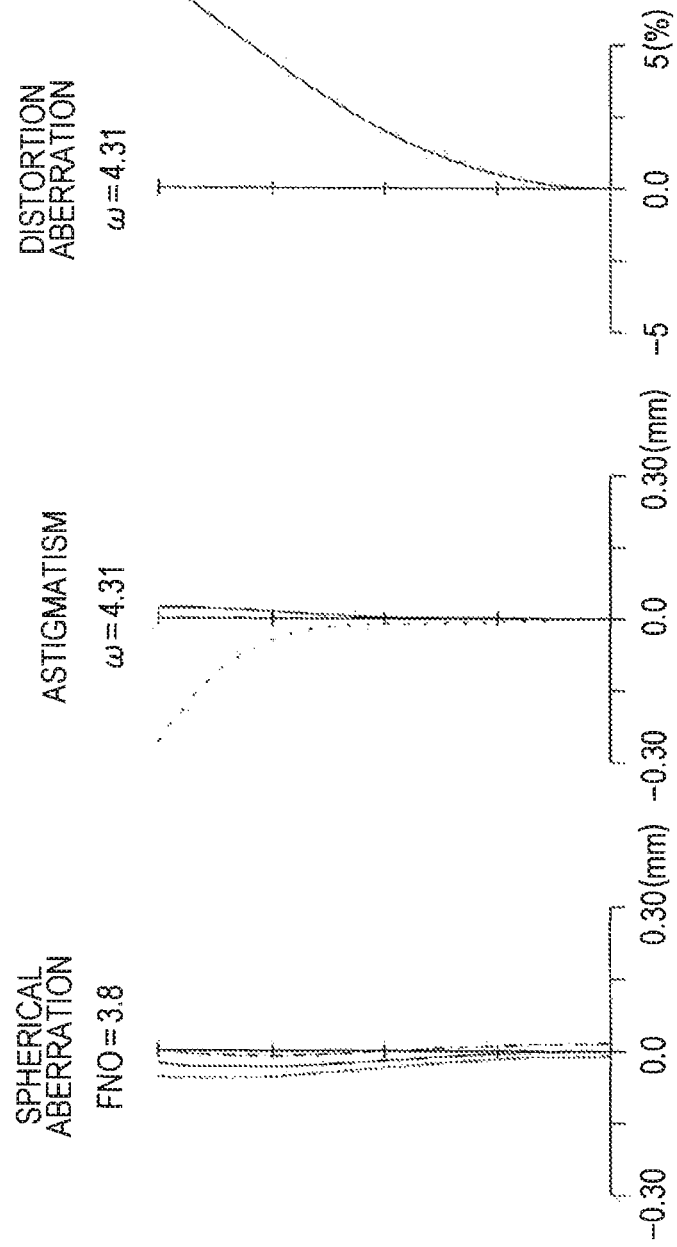
FIG. 7 shows a spherical aberration diagram, an astigmatism diagram, and a distortion aberration diagram at the time of focusing on infinity in the middle focus position focused state of the variable magnification optical system of Example 2.
Figure 8:
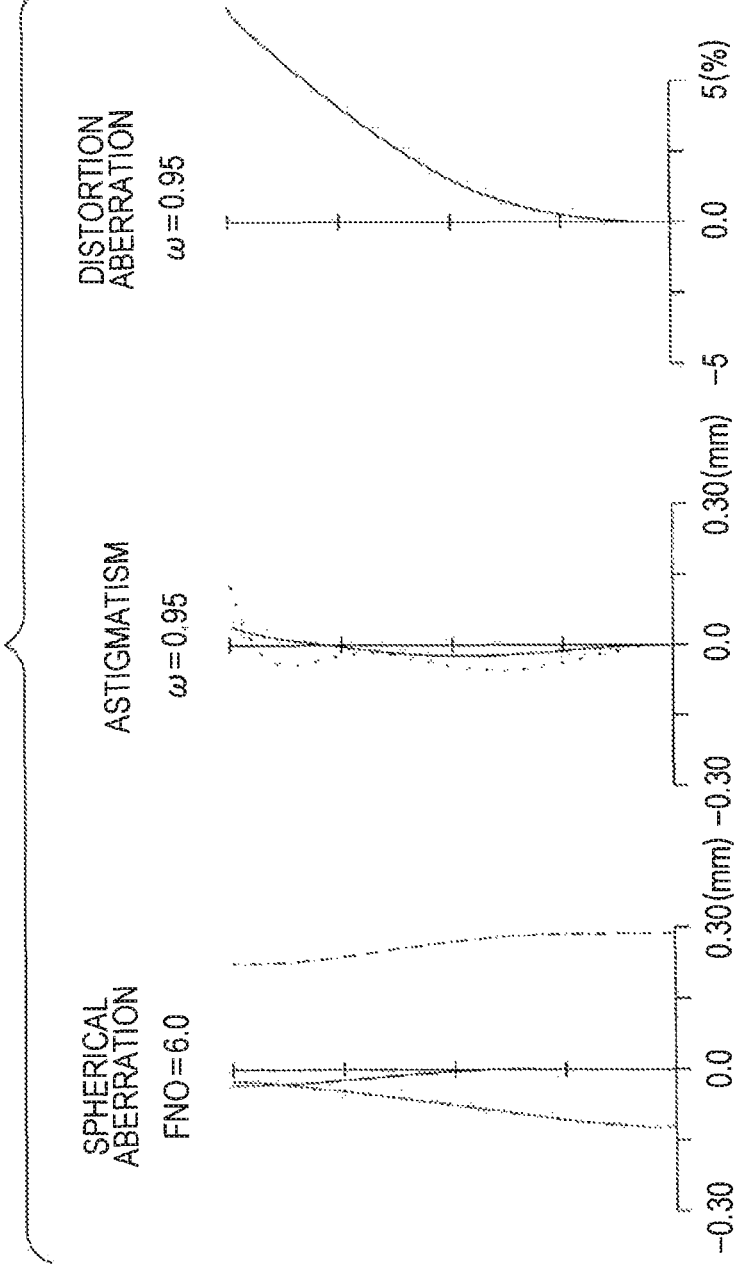
FIG. 8 shows a spherical aberration diagram, an astigmatism diagram, and a distortion aberration diagram at the time of focusing on infinity in the telephoto end focused state of the variable magnification optical system of Example 2.

Next, numerical examples which adopt detailed numerical values of the zoom lens will be described. Table 5 shows surface data of the zoom lens and Tables 6 to 8 show aspherical data, various data, and focal lengths of respective lens groups. Further, Table 37 shows numerical values of the conditional expression (1) to the conditional expression (6)

of the optical system. Further, FIGS. 6 to 8 show vertical aberration diagrams at the time of focusing on infinity in the wide angle end state, the middle focus position state, and the telephoto end state of the zoom lens.

TABLE 5

[SURFACE DATA]

| SURFACE NUMBER | r | d | nd | vd | |
|---|---|---|---|---|---|
| 1 | 98.660 | 1.000 | 2.00100 | 29.13 | |
| 2 | 37.704 | 5.860 | 1.49700 | 81.61 | |
| 3 | −284.720 | 0.150 | | | |
| 4 | 38.638 | 4.500 | 1.49700 | 81.61 | |
| 5 | 721.900 | 0.150 | | | |
| 6 | 39.057 | 3.277 | 1.80420 | 46.50 | |
| 7 | 112.607 | D(7) | | | |
| 8 | 52.897 | 0.600 | 2.00100 | 29.13 | |
| 9 | 9.084 | 2.965 | | | |
| 10 | −19.531 | 0.500 | 1.88100 | 40.14 | |
| 11 | 15.490 | 2.733 | 1.95906 | 17.47 | |
| 12 | −18.030 | 0.381 | | | |
| 13* | −11.624 | 0.500 | 1.85135 | 40.10 | |
| 14* | 101.931 | D(14) | | | |
| 15 | INF | 0.500 | | | S |
| 16* | 10.540 | 5.348 | 1.61881 | 63.85 | |
| 17* | −20.994 | D(17) | | | |
| 18 | 65.947 | 0.700 | 1.91082 | 35.25 | |
| 19 | 10.871 | D(19) | | | |
| 20* | 11.461 | 4.541 | 1.49710 | 81.56 | |
| 21 | −10.505 | 0.700 | 2.00069 | 25.46 | |
| 22 | −13.299 | D(22) | | | |
| 23* | 174.955 | 0.500 | 1.82080 | 42.71 | |
| 24* | 8.086 | D(24) | | | |
| 25* | 24.859 | 1.800 | 1.53116 | 56.04 | |
| 26* | −10.552 | 1.600 | | | |
| 27 | INF | 0.800 | 1.51633 | 64.14 | |
| 28 | INF | 3.300 | | | |

TABLE 6

[ASPHERICAL DATA]

| SURFACE NUMBER | k | A4 | A6 | A8 | A10 |
|---|---|---|---|---|---|
| 13 | −2.1767E+00 | 8.5974E−05 | −2.5594E−07 | −1.7355E−07 | 3.3889E−09 |
| 14 | 0.0000E+00 | 2.2182E−04 | −2.2324E−06 | −4.3708E−08 | 1.7303E−09 |
| 16 | −4.7910E−01 | −6.8827E−05 | −2.8410E−07 | −5.4742E−10 | 6.2026E−12 |
| 17 | −2.0600E−01 | 7.5304E−05 | −3.3024E−07 | 1.8962E−09 | −2.3815E−12 |
| 20 | −5.9830E−01 | −1.2093E−04 | −6.8693E−07 | 9.3917E−09 | −2.4059E−11 |
| 23 | 0.0000E+00 | 4.9615E−05 | −3.8633E−05 | 1.3271E−06 | −5.9009E−08 |
| 24 | 2.3259E+00 | −2.7786E−05 | −9.5528E−05 | 3.0241E−06 | −2.1381E−07 |
| 25 | −2.3408E+01 | 9.4221E−04 | −3.9285E−05 | 1.2795E−06 | −2.4067E−08 |
| 26 | −2.9102E+00 | 6.0710E−04 | 4.7424E−06 | −1.5327E−06 | 4.5962E−08 |

TABLE 7

[VARIOUS DATA]

| | WIDE ANGLE END | MIDDLE | TELEPHOTO END |
|---|---|---|---|
| F | 4.42 | 42.00 | 190.00 |
| Fno | 1.60 | 3.80 | 6.00 |
| ω | 38.13 | 4.31 | 0.95 |
| D(7) | 0.600 | 22.697 | 28.945 |
| D(14) | 30.498 | 8.401 | 2.153 |
| D(17) | 0.934 | 2.217 | 5.661 |
| D(19) | 13.472 | 3.498 | 5.111 |
| D(22) | 5.893 | 13.453 | 1.2109 |
| D(24) | 1.7 | 2.832 | 10.0157 |

TABLE 8

[FOCAL LENGTH OF EACH LENS GROUP]

| F1 | 41.060 |
|---|---|
| F2 | −5.378 |
| F3 | 12.126 |
| F4 | −14.378 |
| F5 | 14.915 |
| F6 | −10.343 |
| F7 | 14.196 |

Example 3

(1) Configuration of Optical System

Figure 9:
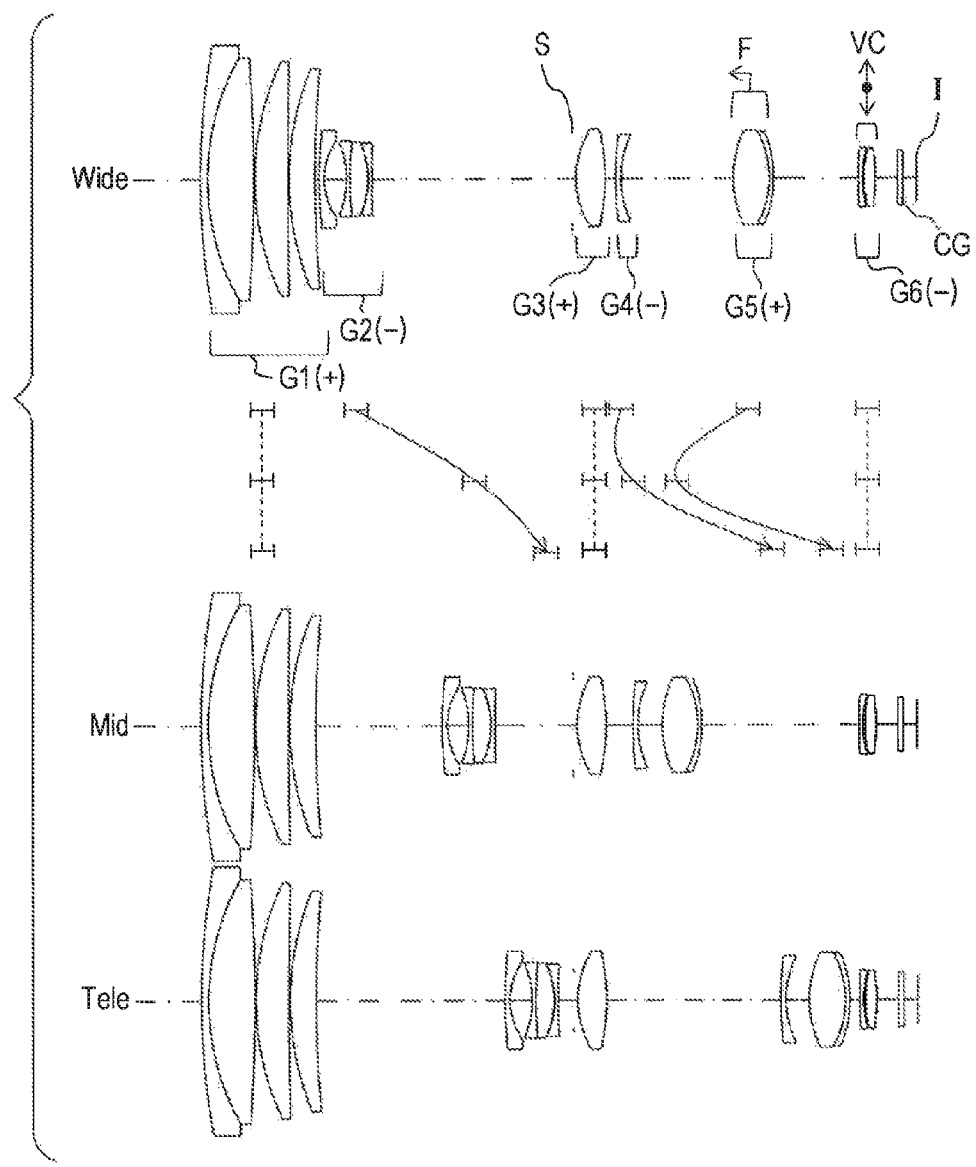
FIG. 9 is a cross-sectional view showing an example of a lens configuration of a variable magnification optical system of Example 3 of the present invention, where an upper stage indicates a wide angle end focused state, a middle stage indicates a middle focus position focused state, and a lower stage indicates a telephoto end focused state.

FIG. 9 shows a lens configuration in a wide angle end state (Wide), a middle focus position state (Mid), and a telephoto end state (Tele) of a zoom lens which is an optical system of Example 3 according to the present invention.

The zoom lens of Example 3 includes a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power in order from an object side. A detailed lens configuration is shown in FIG. 9.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the image side, the fifth lens group G5 is moved along a locus protruding toward the object side, and the sixth lens group G6 is fixed in the optical axis direction. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4 and the fifth lens group G5 respectively serve as compensators.

Further, in the zoom lens, when focusing from the infinite object to the close object, the fifth lens group G5 is moved along the optical axis toward the object side for the focusing operation. Further, the sixth lens group G6 is configured to be movable in a direction perpendicular to the optical axis and serves as a vibration-compensation lens group VC that corrects image blurring at the time of the image pickup operation.

(2) Numerical Example

Figure 10:
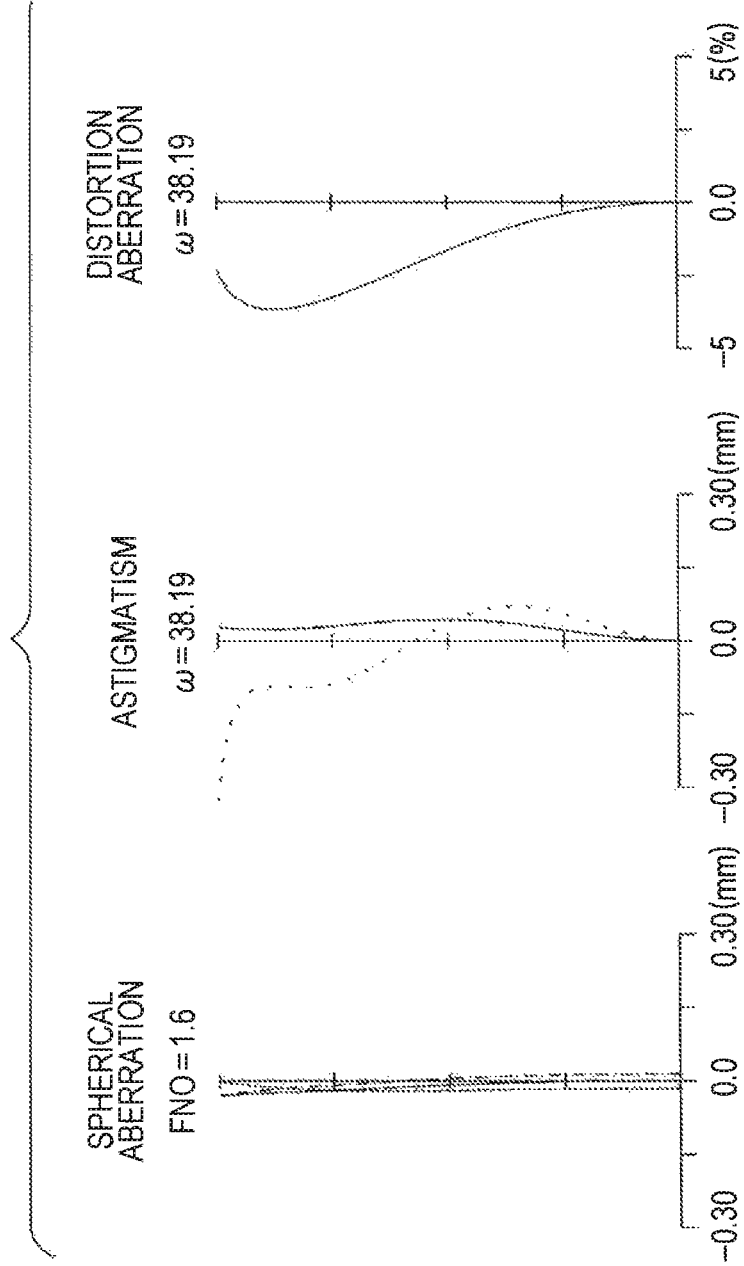
FIG. 10 shows a spherical aberration diagram, an astigmatism diagram, and a distortion aberration diagram at the time of focusing on infinity in the wide angle end focused state of the variable magnification optical system of Example 3.
Figure 11:
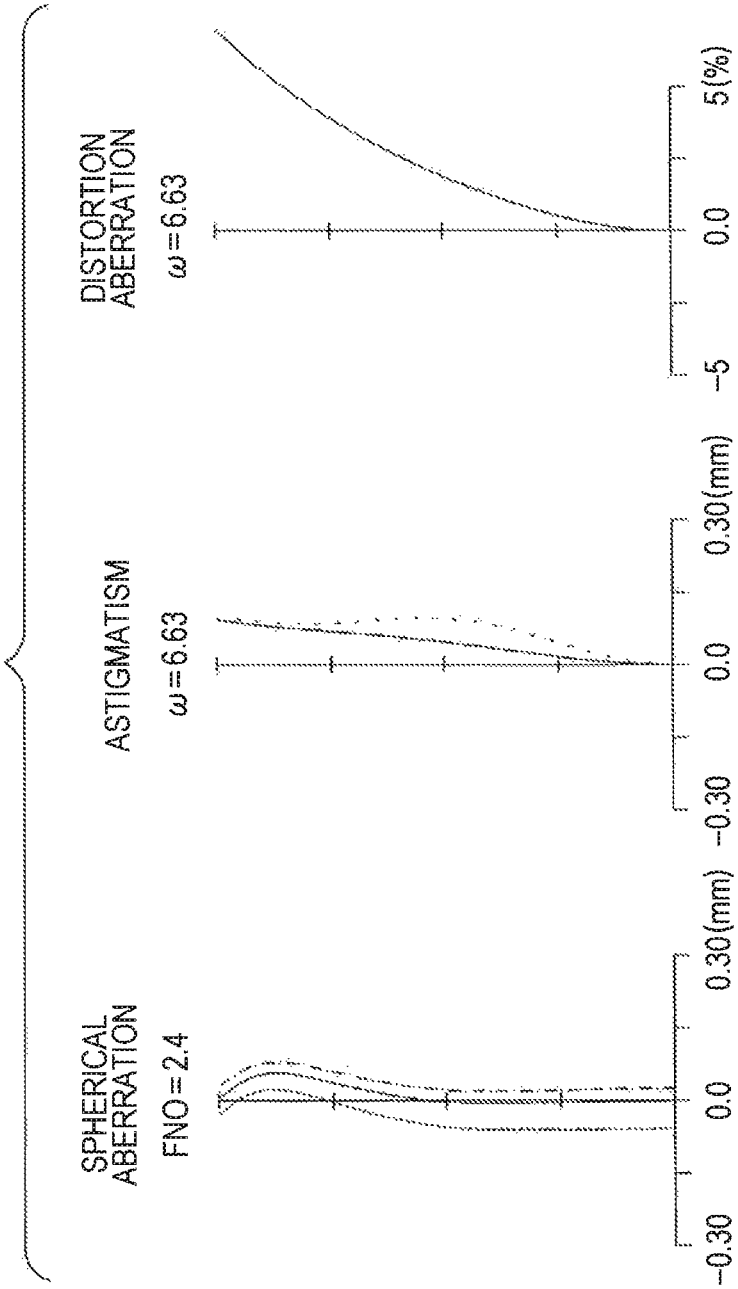
FIG. 11 shows a spherical aberration diagram, an astigmatism diagram, and a distortion aberration diagram at the time of focusing on infinity in the middle focus position focused state of the variable magnification optical system of Example 3.
Figure 12:
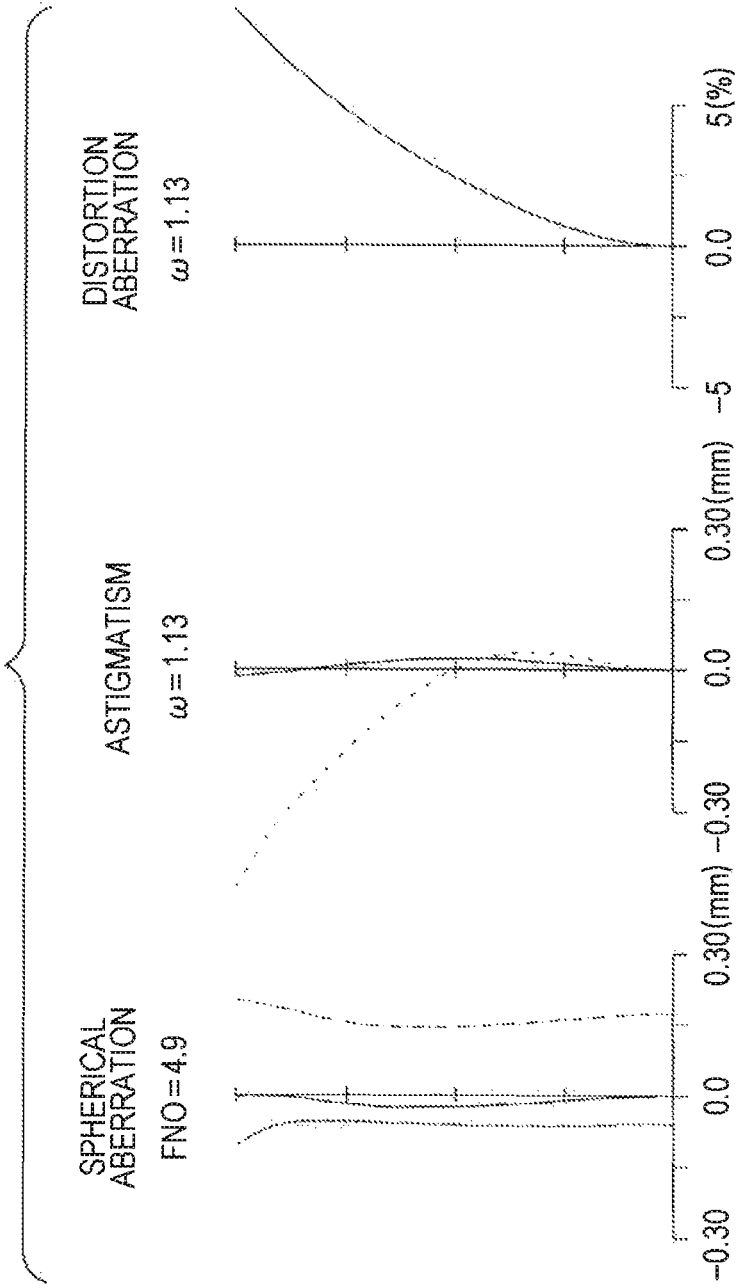
FIG. 12 shows a spherical aberration diagram, an astigmatism diagram, and a distortion aberration diagram at the time of focusing on infinity in the telephoto end focused state of the variable magnification optical system of Example 3.

Next, numerical examples which adopt detailed numerical values of the zoom lens will be described. Table 3 shows surface data of the zoom lens and Tables 10 to 12 show aspherical data, various data, and focal lengths of respective lens groups. Further, Table 37 shows numerical values of the conditional expression (1) to the conditional expression (6) of the optical system. Further, FIGS. 10 to 12 show vertical aberration diagrams at the time of focusing on infinity in the wide angle end state, the middle focus position state, and the telephoto end state of the zoom lens.

TABLE 9

[SURFACE DATA]

| SURFACE NUMBER | r | d | nd | vd |
|---|---|---|---|---|
| 1 | 102.452 | 1.000 | 2.00100 | 29.13 |
| 2 | 34.323 | 6.332 | 1.49700 | 81.61 |
| 3 | −231.550 | 0.150 | | |
| 4 | 37.522 | 4.577 | 1.49700 | 81.61 |
| 5 | 651.705 | 0.150 | | |
| 6 | 39.831 | 3.604 | 1.83481 | 42.72 |
| 7 | 163.160 | D(7) | | |
| 8 | 66.725 | 0.700 | 2.00100 | 29.13 |
| 9 | 9.418 | 3.056 | | |
| 10 | −13.250 | 0.500 | 1.88100 | 40.14 |
| 11 | 52.567 | 2.513 | 1.95906 | 17.47 |
| 12 | −12.025 | 0.100 | | |
| 13* | −9.256 | 0.500 | 1.85135 | 40.10 |
| 14* | −69.006 | D(14) | | |
| 15 | INF | 0.500 | | S |
| 16* | 12.352 | 4.041 | 1.49710 | 81.56 |
| 17* | −25.189 | D(17) | | |
| 18 | 52.381 | 0.700 | 1.80420 | 46.50 |
| 19 | 13.359 | D(19) | | |
| 20* | 13.952 | 5.027 | 1.49710 | 81.56 |
| 21 | −13.077 | 0.600 | 2.00069 | 25.46 |
| 22 | −16.520 | D(22) | | |
| 23 | 178.875 | 0.500 | 2.00069 | 25.46 |
| 24 | 14.477 | 0.218 | | |
| 25* | 12.079 | 1.609 | 1.53116 | 56.04 |
| 26* | −32.513 | 1.600 | | |
| 27 | INF | 0.800 | 1.51633 | 64.14 |
| 28 | INF | 3.300 | | |

TABLE 10

[ASPHERICAL DATA]

| SURFACE NUMBER | k | A4 | A6 | A8 | A10 |
|---|---|---|---|---|---|
| 13 | −3.4922E+00 | 5.6566E−04 | −3.1054E−05 | 5.6896E−07 | −5.3448E−09 |
| 14 | 0.0000E+00 | 9.9834E−04 | −3.6231E−05 | 7.0630E−07 | −7.4087E−09 |
| 16 | −1.2210E−01 | −3.1324E−05 | −1.8748E−07 | 1.7150E−09 | −1.7996E−12 |
| 17 | −2.1200E−02 | 8.1301E−05 | 5.7579E−08 | −1.4894E−09 | 1.9041E−11 |
| 20 | −1.0000E−01 | −7.1098E−05 | −9.5703E−08 | −4.8624E−09 | 2.9219E−11 |
| 25 | −1.9286E+01 | 2.6629E−04 | −6.0070E−05 | 4.0620E−06 | −2.1126E−08 |
| 26 | −9.9086E+00 | −4.1870E−04 | −3.9371E−05 | 4.7395E−06 | −4.4563E−08 |

TABLE 11

[VARIOUS DATA]

| | WIDE ANGLE END | MIDDLE | TELEPHOTO END |
|---|---|---|---|
| F | 4.43 | 27.32 | 158.56 |
| Fno | 1.60 | 2.40 | 4.90 |
| ω | 38.19 | 6.63 | 1.13 |

TABLE 11-continued

[VARIOUS DATA]

| | WIDE ANGLE END | MIDDLE | TELEPHOTO END |
|---|---|---|---|
| D(7) | 0.607 | 17.712 | 26.400 |
| D(14) | 27.900 | 10.796 | 2.108 |
| D(17) | 1.427 | 3.708 | 24.380 |
| D(19) | 15.839 | 3.408 | 3.283 |
| D(22) | 11.824 | 21.974 | 1.4263 |

TABLE 12

[FOCAL LENGTH OF EACH LENS GROUP]

| F1 | 38.606 |
|---|---|
| F2 | −5.782 |
| F3 | 17.290 |
| F4 | −22.477 |
| F5 | 18.175 |
| F6 | −488.596 |

Example 4

(1) Configuration of Optical System

Figure 13:
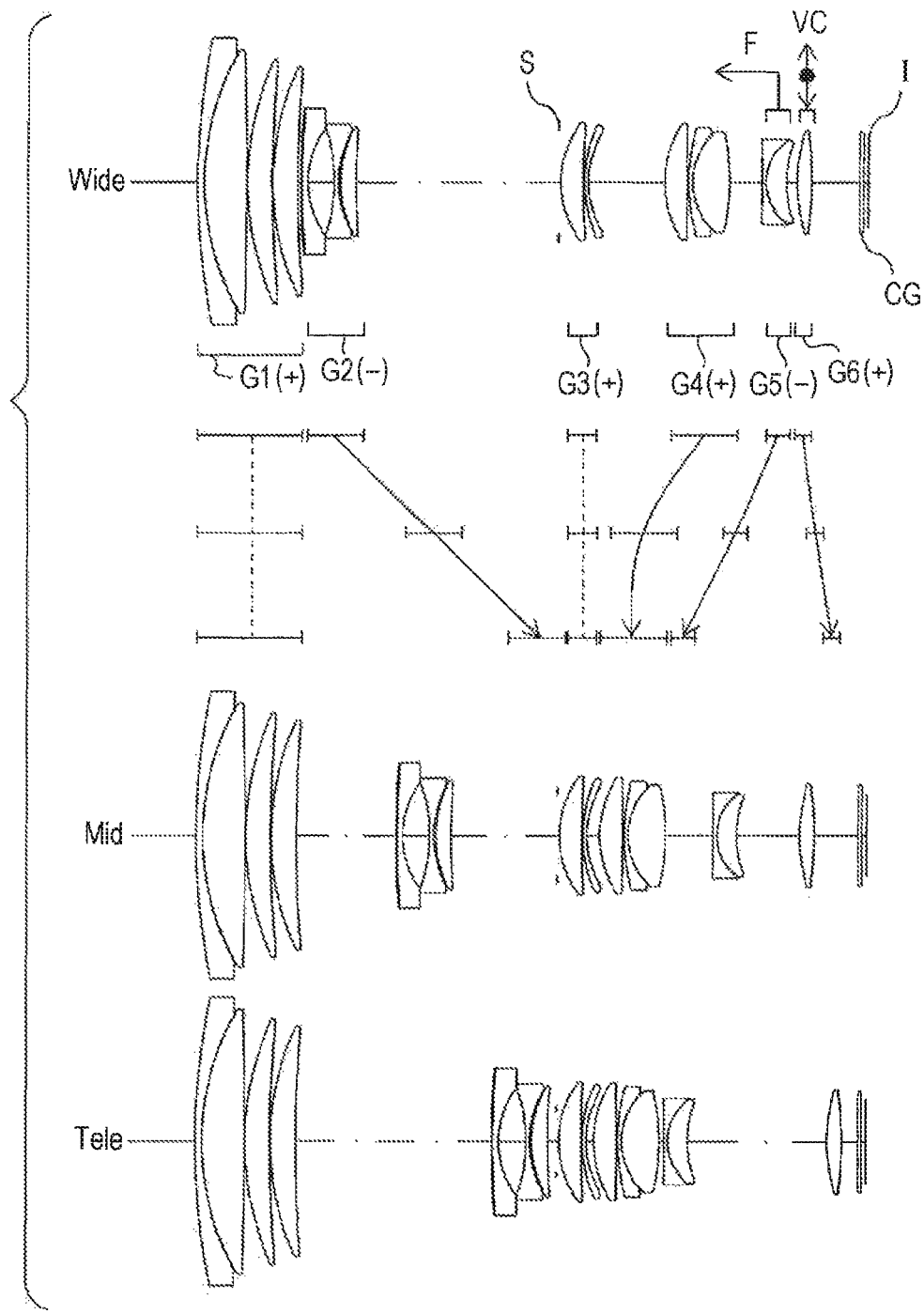
FIG. 13 is a cross-sectional view allowing an example of a lens configuration of a variable magnification optical system of Example 4 of the present invention, where an upper stage indicates a wide angle end focused state, a middle stage indicates a middle focus position focused state, and a lower stage indicates a telephoto end focused state.

FIG. 13 shows a lens configuration in a wide angle end state (Wide), a middle focus position state (Mid), and a telephoto end state (Tele) of a zoom lens which is an optical system of Example 4 according to the present invention.

The zoom lens of Example 4 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 13.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the object side, the fifth lens group G5 is moved toward the object side, and the sixth lens group G6 is moved toward the image side. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4, the fifth lens group G5, and the sixth lens group G6 respectively serve as compensators.

Further, in the zoom lens, when focusing from the infinite object to the close object, the fifth lens group G5 is moved along the optical axis toward the object side for the focusing operation. Further, the sixth lens group G6 is configured to be movable in a direction perpendicular to the optical axis and serves as a vibration-compensation lens group VC that corrects image blurring at the time of the image pickup operation.

(2) Numerical Example

Figure 14:
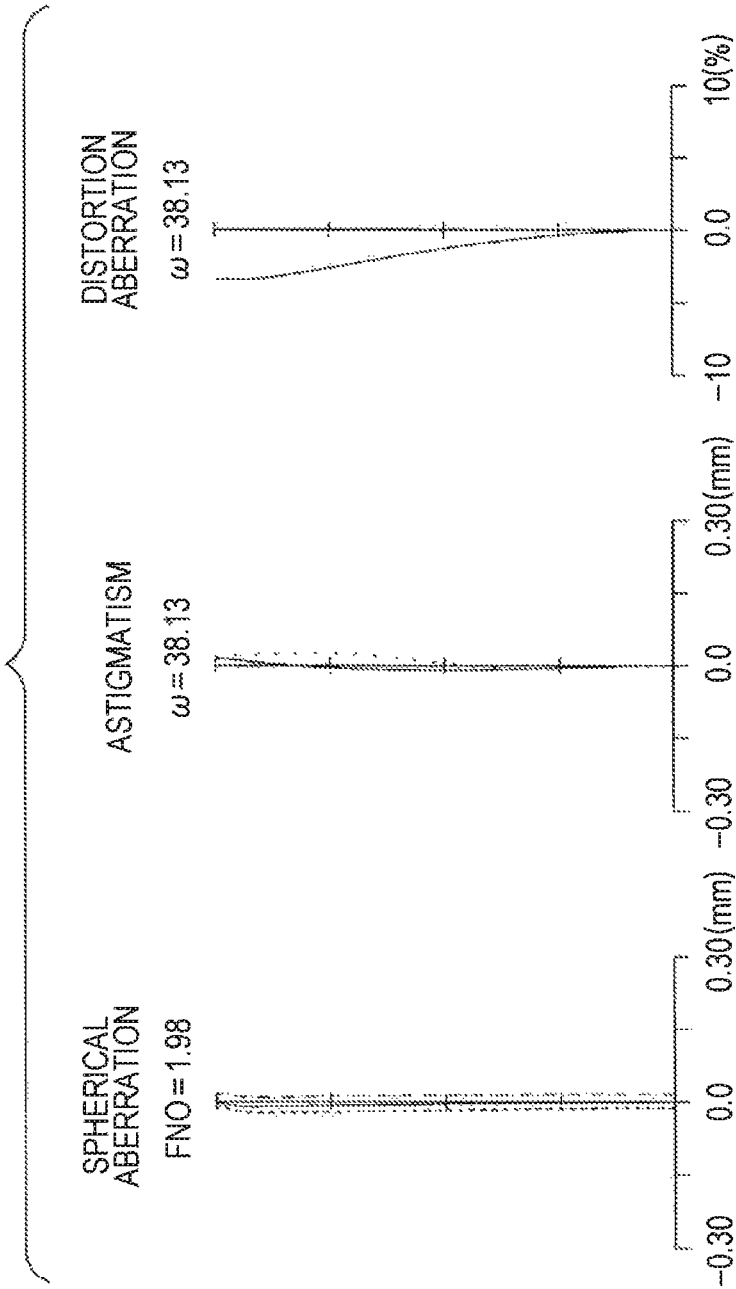
FIG. 14 shows a spherical aberration diagram, an astigmatism diagram, and a distortion aberration diagram at the time of focusing on infinity in the wide angle end focused state of the variable magnification optical system of Example 4.
Figure 15:
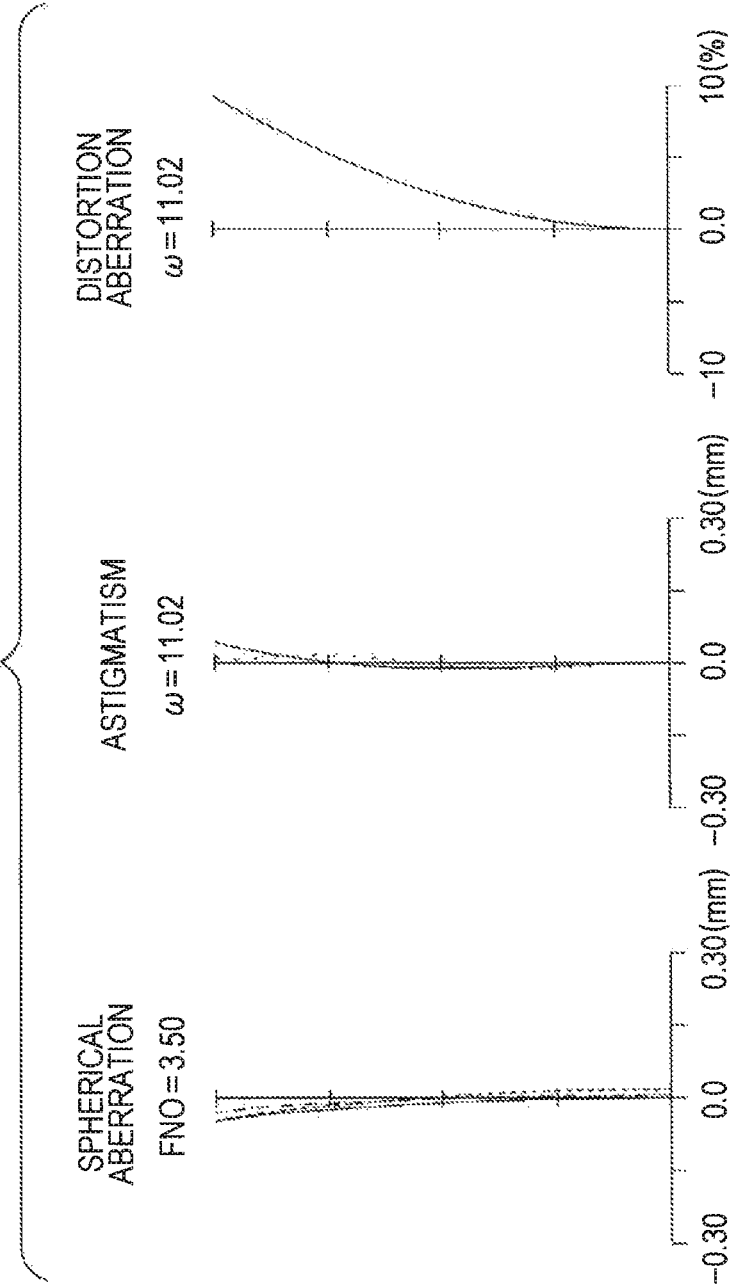
FIG. 15 shows a spherical aberration diagram, an astigmatism diagram, and a distortion aberration diagram at the time of focusing on infinity in the middle focus position focused state of the variable magnification optical system of Example 4.
Figure 16:
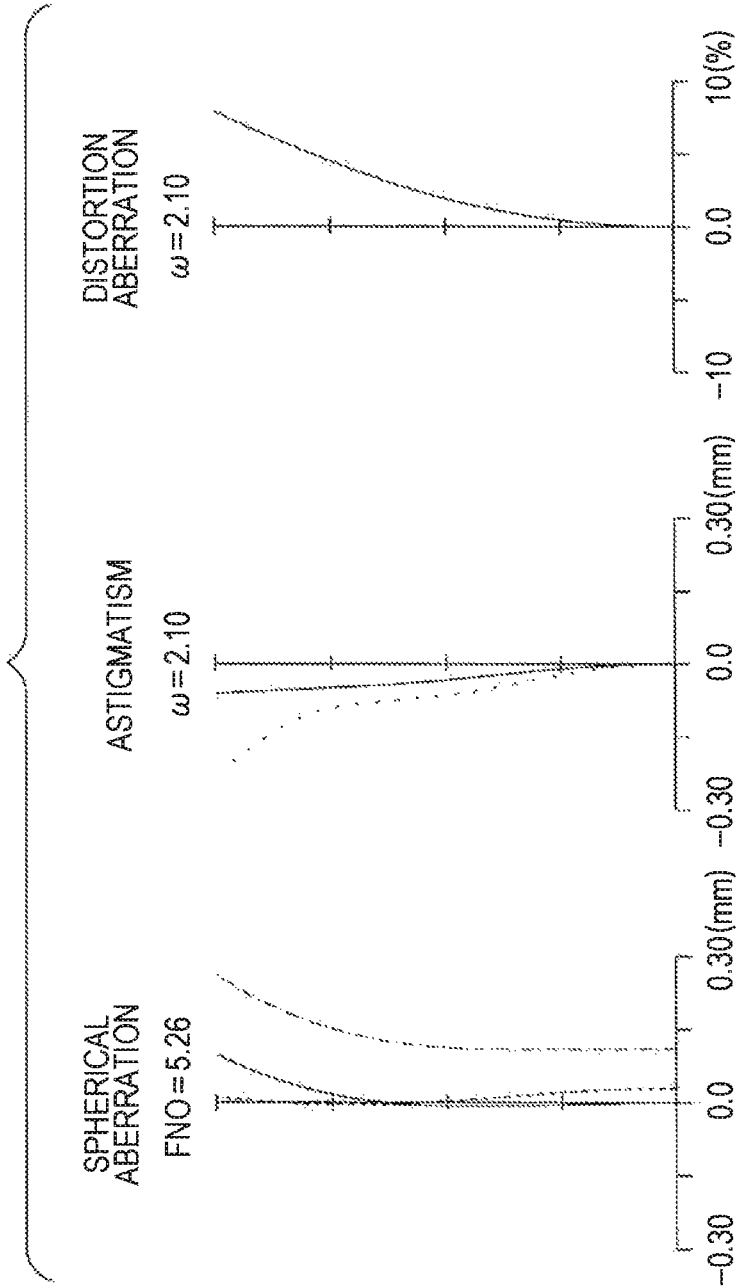
FIG. 16 shows a spherical aberration diagram, an astigmatism diagram, and a distortion aberration diagram at the time of focusing on infinity in the telephoto end focused state of the variable magnification optical system of Example 4.

Next, numerical examples which adopt detailed numerical values of the zoom lens will be described. Table 13 shows the surface data of the zoom lens and Tables 14 to 16 show a spherical data, various data, and focal lengths of respective lens groups. Further, Table 37 shows numerical values of the conditional expression (1) to the conditional expression (6) of the optical system. Further, FIGS. 14 to 16 show vertical aberration diagrams at the time of focusing on infinity in the wide angle end state, the middle focus position state, and the telephoto end state of the zoom lens.

TABLE 13

[SURFACE DATA]

| SURFACE NUMBER | r | d | Nd | vd | |
|---|---|---|---|---|---|
| 1 | 85.355 | 0.750 | 1.9037 | 31.31 | |
| 2 | 30.738 | 5.030 | 1.4970 | 81.61 | |
| 3 | −536.470 | 0.075 | | | |
| 4 | 34.773 | 2.908 | 1.4970 | 81.61 | |
| 5 | 138.769 | 0.075 | | | |
| 6 | 31.779 | 3.004 | 1.7292 | 54.67 | |
| 7 | 146.461 | D(7) | | | |
| 8* | 248.049 | 0.100 | 1.5141 | 49.72 | |
| 9 | 111.725 | 0.700 | 1.8042 | 46.50 | |
| 10 | 10.574 | 3.224 | | | |
| 11 | −17.894 | 0.450 | 1.8348 | 42.72 | |
| 12 | 12.064 | 0.234 | | | |
| 13 | 13.088 | 1.899 | 1.9591 | 17.47 | |
| 14 | 110.144 | D(14) | | | |
| 15 | INF | 0.300 | | | S |
| 16* | 11.236 | 2.709 | 1.5920 | 67.02 | |
| 17* | 210.176 | 0.100 | | | |
| 18 | 16.426 | 0.450 | 1.9037 | 31.31 | |
| 19 | 11.412 | D(19) | | | |
| 20* | 12.670 | 2.750 | 1.7290 | 54.04 | |
| 21* | −143.550 | 0.152 | | | |
| 22 | 24.921 | 0.450 | 1.9108 | 35.25 | |
| 23 | 7.899 | 4.464 | 1.4970 | 81.61 | |
| 24 | −25.595 | D(24) | | | |
| 25 | −137.029 | 0.450 | 1.9108 | 35.25 | |
| 26 | 6.067 | 2.382 | 1.8081 | 22.76 | |
| 27 | 12.627 | D(27) | | | |
| 28* | 20.084 | 1.770 | 1.5920 | 67.02 | |
| 29* | −31.288 | D(29) | | | |
| 30 | INF | 0.500 | 1.5163 | 64.14 | |
| 31 | INF | 0.500 | | | |

TABLE 14

[ASPHERICAL DATA]

| SURFACE NUMBER | k | A4 | A6 | A8 | A10 |
|---|---|---|---|---|---|
| 8 | 0.0000E+00 | 4.4557E−05 | −2.9826E−07 | 2.9745E−09 | −5.5475E−12 |
| 16 | −4.3205E−01 | −2.2768E−05 | 4.8967E−08 | 3.8356E−09 | 3.8969E−11 |
| 17 | 0.0000E+00 | 2.9307E−05 | 1.2327E−07 | 3.9005E−09 | 2.2235E−11 |
| 20 | 0.0000E+00 | −2.3410E−05 | 1.9654E−07 | −3.5522E−09 | 6.9598E−11 |
| 21 | 0.0000E+00 | 5.9039E−05 | −4.9576E−08 | −7.7226E−10 | 4.4344E−11 |
| 28 | 0.0000E+00 | 2.7924E−05 | 2.8380E−06 | −3.6994E−07 | 5.9604E−09 |
| 29 | 0.0000E+00 | 1.8278E−04 | 6.7895E−06 | −5.6931E−07 | 8.6248E−09 |

TABLE 15

[VARIOUS DATA]

| | WIDE ANGLE END | MIDDLE | TELEPHOTO END |
|---|---|---|---|
| F | 7.25 | 25.77 | 138.33 |
| Fno | 1.98 | 3.50 | 5.26 |
| ω | 38.13 | 11.02 | 2.10 |
| D(7) | 0.395 | 12.051 | 23.568 |
| D(14) | 24.123 | 12.466 | 0.950 |
| D(19) | 9.140 | 1.561 | 0.890 |
| D(24) | 3.885 | 5.793 | 0.620 |
| D(27) | 1.322 | 7.484 | 16.644 |
| D(29) | 5.709 | 5.218 | 1.903 |

TABLE 16

[FOCAL LENGTH OF EACH LENS GROUP]

| F1 | 36.955 |
|---|---|
| F2 | −7.570 |
| F3 | 33.206 |
| F4 | 15.806 |
| F5 | −11.149 |
| F6 | 20.930 |

Example 5

(1) Configuration of Optical System

Figure 17:
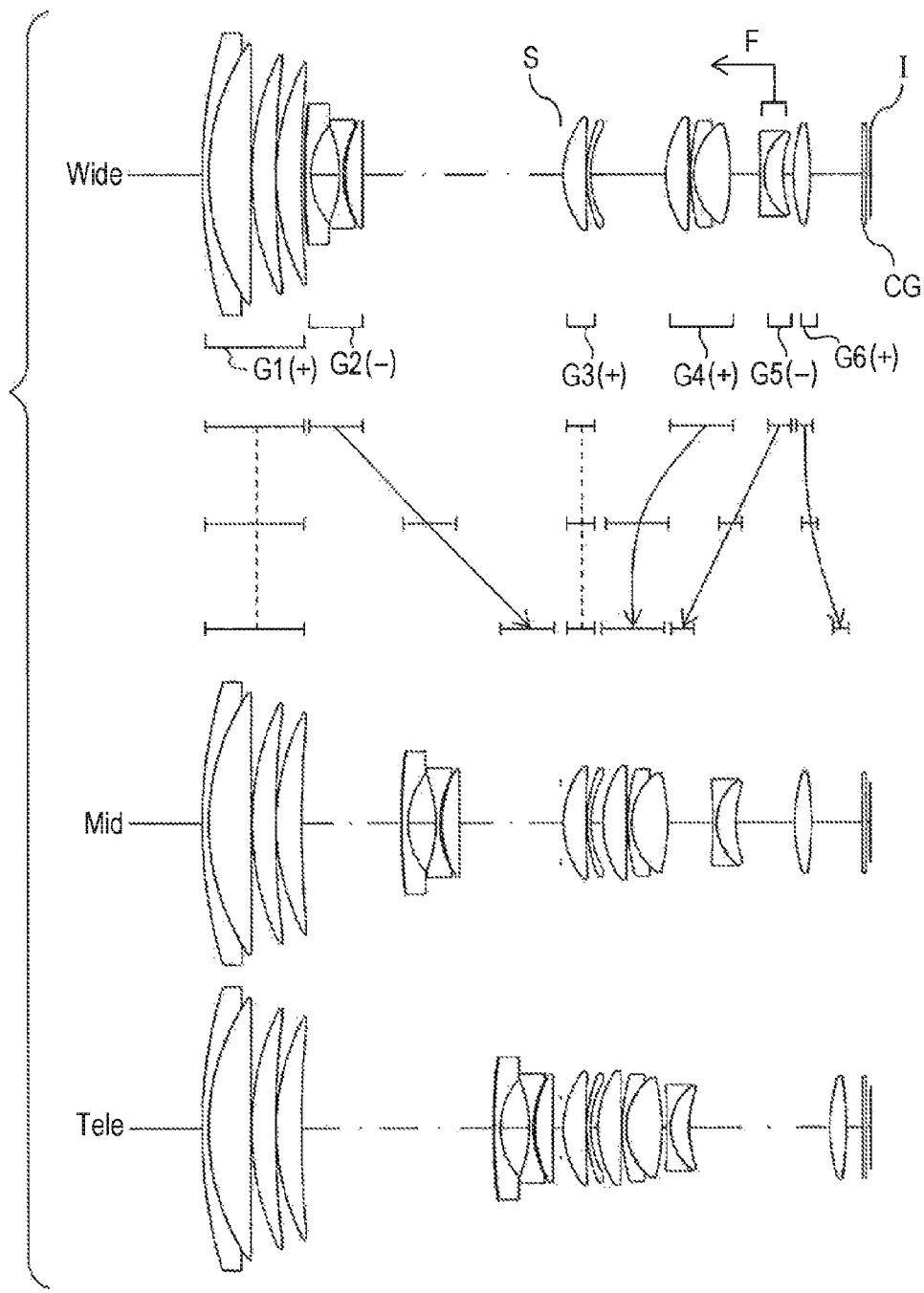
FIG. 17 is a cross-sectional view showing an example of a lens configuration of a variable magnification optical system of Example 5 of the present invention, where an upper stage indicates a wide angle end focused state, a middle stage indicates a middle focus position focused state, and a lower stage indicates a telephoto end focused state.

FIG. 17 shows a lens configuration in a wide angle end state (Wide), a middle focus position state (Mid), and a telephoto end state (Tele) of a zoom less which is an optical system of Example 5 according to the present invention.

The zoom lens of Example 5 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 17.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the object side, the fifth lens group G5 is moved toward the object side, and the sixth lens group G6 is moved toward the image side. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4, the fifth lens group G5, and the sixth lens group G6 respectively serve as compensators.

Further, in the zoom lens, when focusing from the infinite object to the close object, the fifth lens group G5 is moved along the optical axis toward the object side for the focusing operation.

(2) Numerical Example

Figure 18:
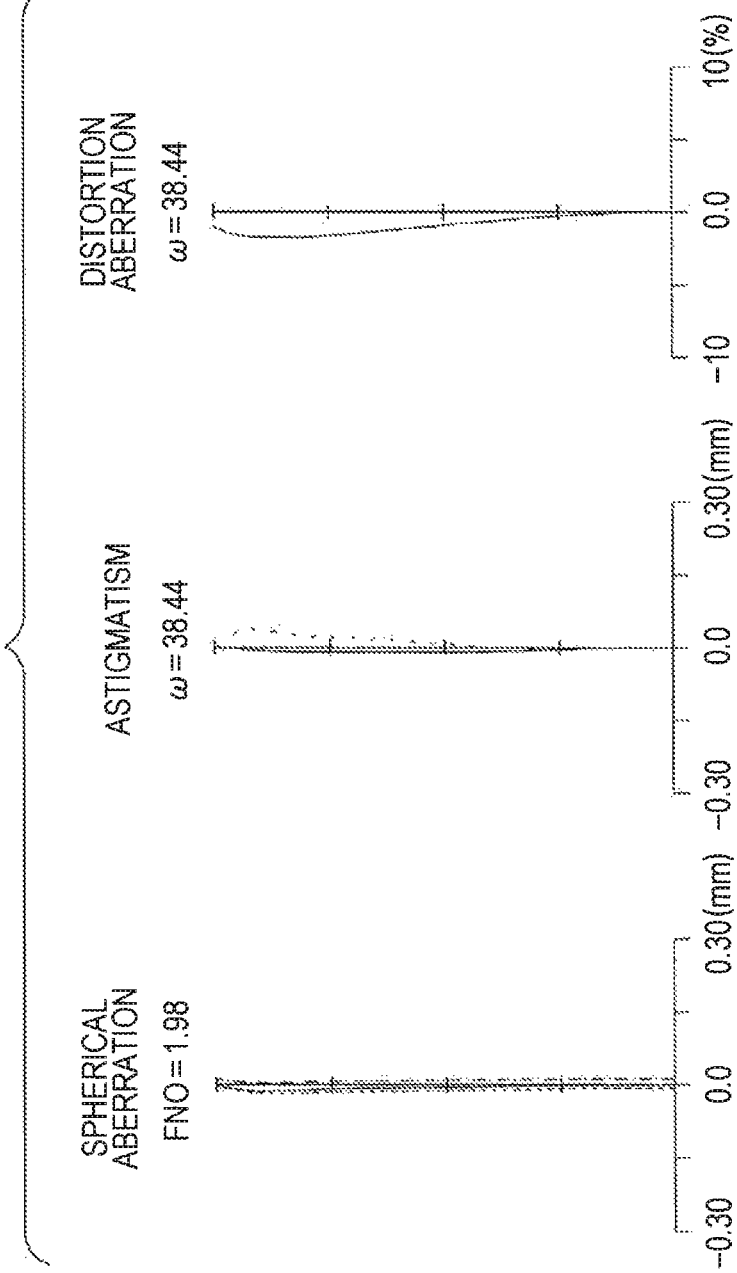
FIG. 18 shows a spherical aberration diagram, an astigmatism diagram, and a distortion aberration diagram at the time of focusing on infinity in the wide angle end focused state of the variable magnification optical system of Example 5.
Figure 19:
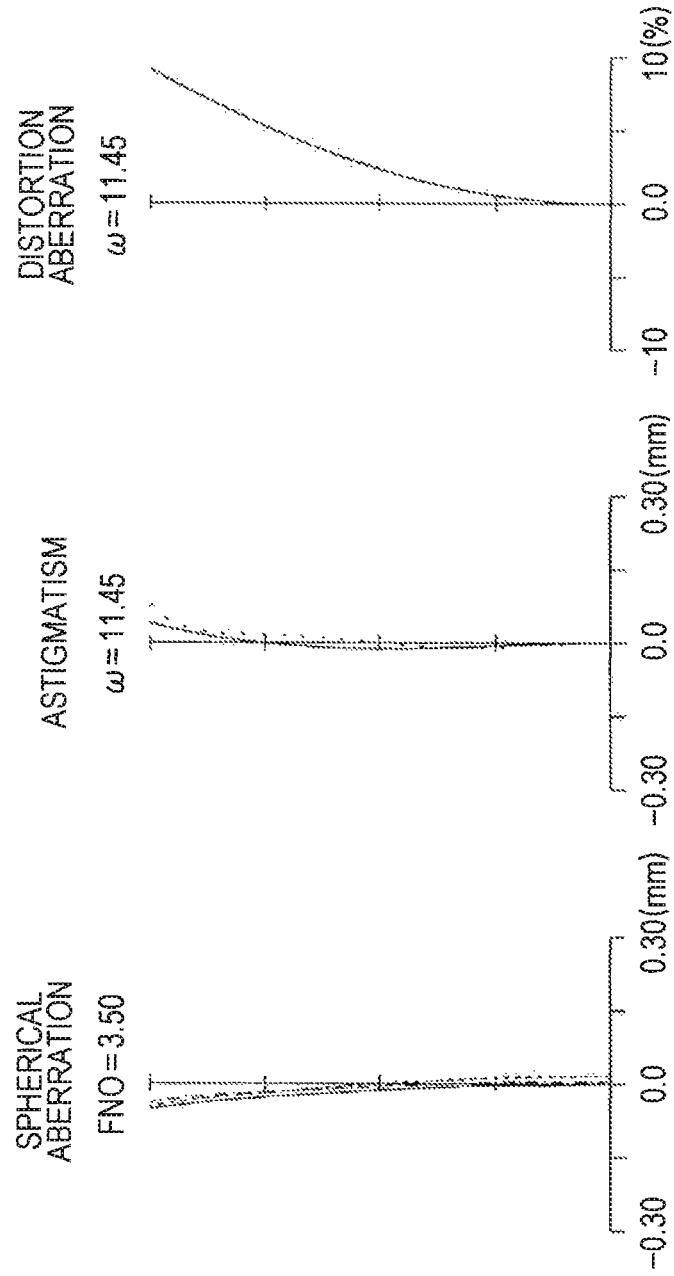
FIG. 19 shows a spherical aberration diagram, an astigmatism diagram, and a distortion aberration diagram at the time of focusing on infinity in the middle focus position focused state of the variable magnification optical system of Example 5.
Figure 20:
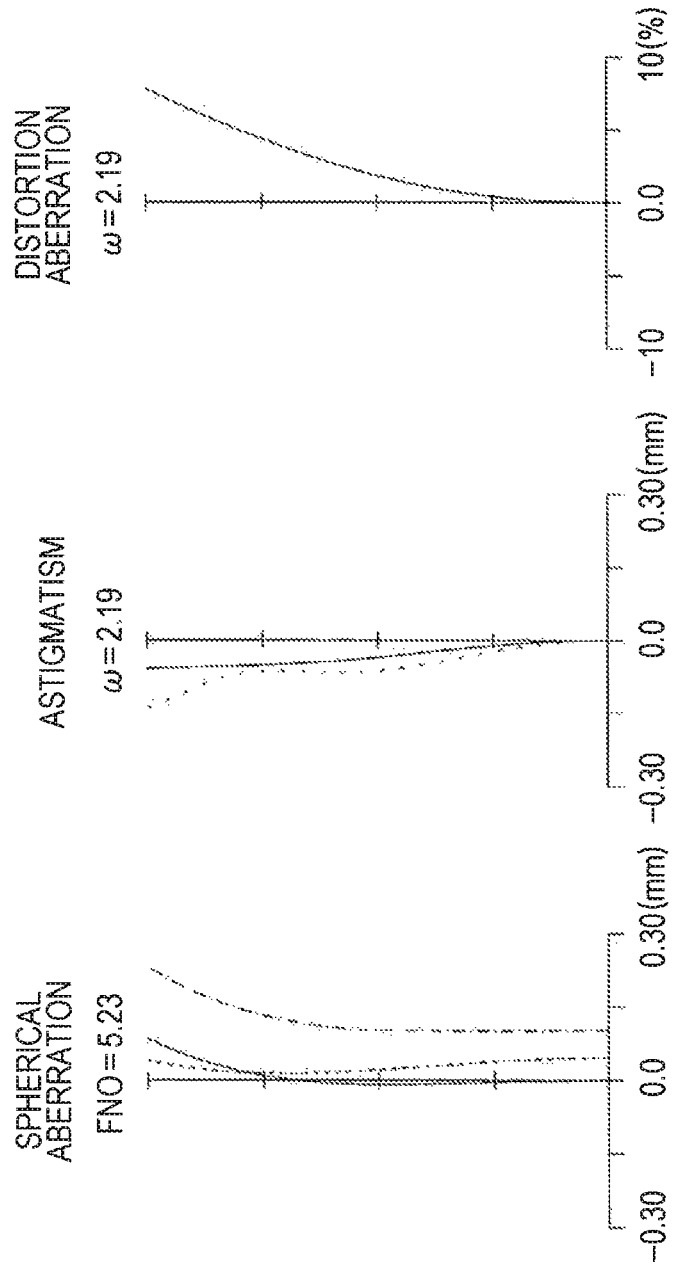
FIG. 20 shows a spherical aberration diagram, an astigmatism diagram, and a distortion aberration diagram at the time of focusing on infinity in the telephoto end focused state of the variable magnification optical system of Example 5.

Next, numerical examples which adopt detailed numerical values of the optical system will be described. Table 17 shows surface data of the zoom lens and Tables 18 to 20 show aspherical data, various data, and focal lengths of respective lens groups. Further, Table 37 shows numerical values of the conditional expression (1) to the conditional expression (6) of the optical system. Further, FIGS. 18 to 20 show vertical aberration diagrams at the time of focusing on infinity in the wide angle end state, the middle focus position state, and the telephoto end state of the zoom lens.

TABLE 17

[SURFACE DATA]

| SURFACE NUMBER | r | d | Nd | vd |
|---|---|---|---|---|
| 1 | 64.972 | 0.750 | 2.0010 | 29.13 |
| 2 | 30.865 | 5.041 | 1.4970 | 81.61 |
| 3 | −14770.8 | 0.075 | | |
| 4 | 35.226 | 2.864 | 1.4970 | 81.61 |
| 5 | 121.436 | 0.075 | | |
| 6 | 30.551 | 3.018 | 1.7292 | 54.67 |
| 7 | 131.690 | D(7) | | |
| 8* | 170.444 | 0.100 | 1.5141 | 49.72 |
| 9 | 83.780 | 0.700 | 1.8042 | 46.50 |
| 10 | 9.547 | 3.408 | | |
| 11 | −16.461 | 0.450 | 1.8348 | 42.72 |
| 12 | 12.889 | 0.253 | | |
| 13 | 14.147 | 2.102 | 1.9591 | 17.47 |
| 14 | 737.287 | D(14) | | |
| 15 | INF | 0.300 | | S |
| 16* | 11.175 | 2.730 | 1.5920 | 67.02 |
| 17* | 209.062 | 0.100 | | |
| 18 | 17.264 | 0.450 | 1.9037 | 31.31 |
| 19 | 11.728 | D(19) | | |
| 20* | 12.739 | 2.834 | 1.7290 | 54.04 |
| 21* | −125.989 | 0.134 | | |
| 22 | 25.115 | 0.450 | 1.9108 | 35.25 |
| 23 | 7.884 | 4.347 | 1.4970 | 81.61 |
| 24 | −24.928 | D(24) | | |
| 25 | −113.228 | 0.450 | 1.9108 | 35.25 |
| 28 | 6.626 | 2.232 | 1.8081 | 22.76 |
| 27 | 13.894 | D(27) | | |
| 28* | 20.118 | 1.980 | 1.5920 | 67.02 |
| 29* | −33.219 | D(29) | | |
| 30 | INF | 0.500 | 1.5163 | 64.14 |
| 31 | INF | 0.500 | | |

TABLE 18

[ASPHERICAL DATA]

| SURFACE NUMBER | k | A4 | A6 | A8 | A10 |
|---|---|---|---|---|---|
| 8 | 0.0000E+00 | 5.9878E−05 | −3.7490E−07 | 2.4029E−09 | −1.1099E−12 |
| 17 | −4.3893E−01 | −2.3583E−05 | 3.6977E−08 | 4.2543E−09 | 3.3542E−11 |
| 18 | 0.0000E+00 | 3.0242E−05 | 1.4262E−07 | 3.2755E−09 | 3.0917E−11 |
| 21 | 0.0000E+00 | −2.4468E−05 | 1.9043E−07 | −3.4920E−09 | 6.9069E−11 |
| 22 | 0.0000E+00 | 5.9301E−05 | −4.8555E−08 | −1.0024E−09 | 4.7884E−11 |
| 29 | 0.0000E+00 | 2.6024E−05 | 3.2738E−06 | −3.7301E−07 | 5.8758E−09 |
| 30 | 0.0000E+00 | 1.6485E−04 | 6.9228E−06 | −5.5464E−07 | 8.3371E−09 |

TABLE 19

[VARIOUS DATA]

| | WIDE ANGLE END | MIDDLE | TELEPHOTO END |
|---|---|---|---|
| F | 7.00 | 24.88 | 133.53 |
| Fno | 1.98 | 3.50 | 5.23 |
| ω | 38.44 | 11.45 | 2.19 |
| D(7) | 0.350 | 11.999 | 23.041 |
| D(14) | 23.641 | 11.992 | 0.950 |
| D(19) | 9.118 | 1.527 | 0.868 |
| D(24) | 3.561 | 5.488 | 0.601 |
| D(27) | 1.241 | 7.048 | 16.797 |
| D(29) | 6.247 | 6.104 | 1.900 |

TABLE 20

[FOCAL LENGTH OF EACH LENS GROUP]

| F1 | 36.486 |
|---|---|
| F2 | −7.371 |
| F3 | 33.514 |
| F4 | 15.700 |
| F5 | −11.970 |
| F6 | 21.461 |

Example 6

(1) Configuration of Optical System

Figure 21:
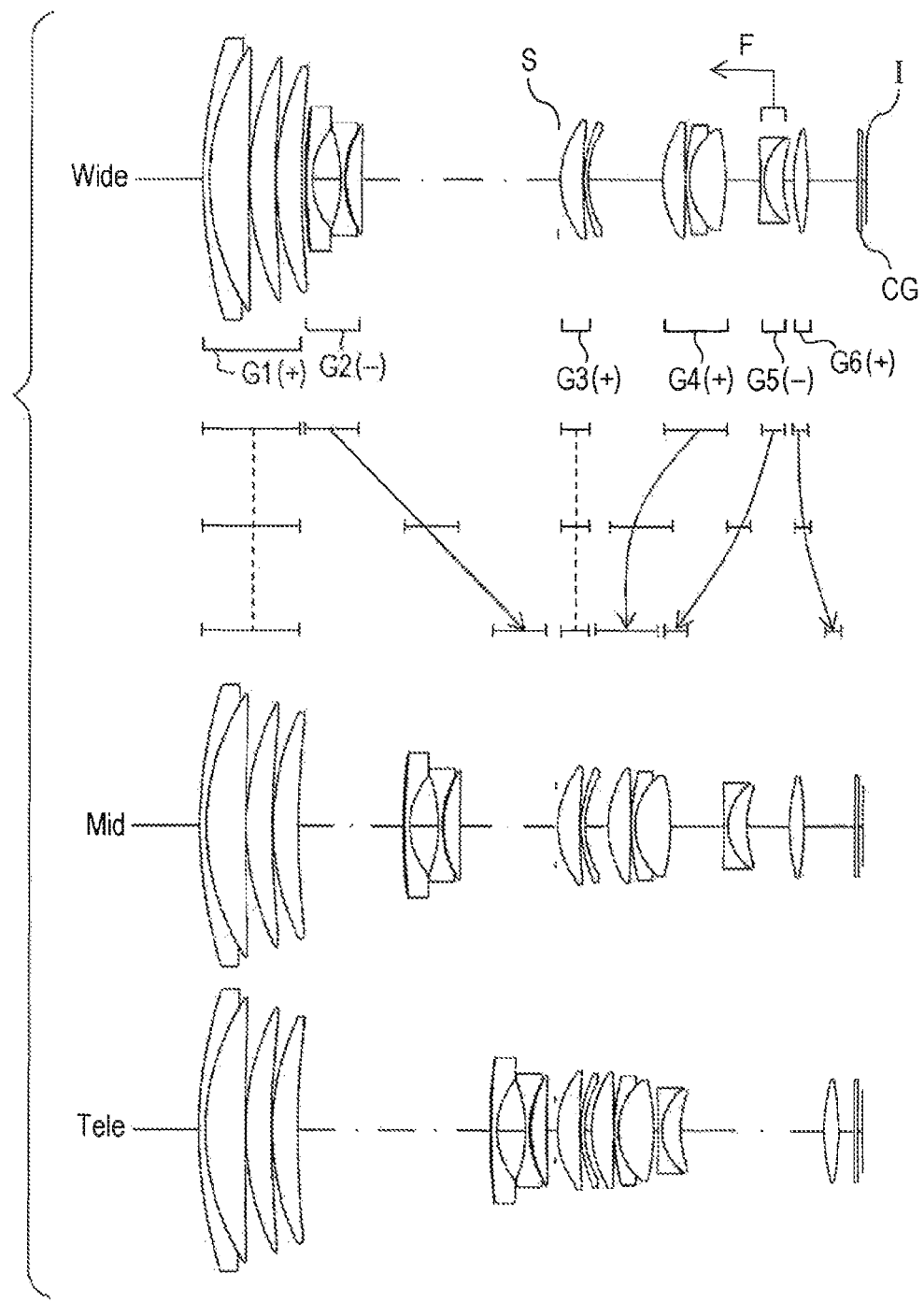
FIG. 21 is a cross-sectional view showing an example of a lens configuration of a variable magnification optical system of Example 6 of the present invention, where an upper stage indicates a wide angle end focused state, a middle stage indicates a middle focus position focused state, and a lower stage indicates a telephoto end focused state.

FIG. 21 shows a lens configuration in a wide angle end state (Wide), a middle focus position state (Mid), and a telephoto end state (Tele) of a zoom lens which is an optical system of Example 6 according to the present invention.

The zoom lens of Example 6 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 21.

In the zoom lens, when zooming from the wide angle and to the telephoto end, the first lens group G1 is fixed in the optical axis direction, the second lens group G2 is moved toward the image side, the third lens group G3 is fixed in the optical axis direction, the fourth lens group G4 is moved toward the object side, and the fifth lens group G5 is moved toward the object side, and the sixth lens group G6 is moved toward the image side. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4, the fifth lens group G5, and the sixth lens group G6 respectively serve as compensators.

Further, in the zoom lens, when focusing from the infinite object to the close object, the fifth lens group G5 is moved along the optical axis toward the object side for the focusing operations.

(2) Numerical Example

Figure 22:
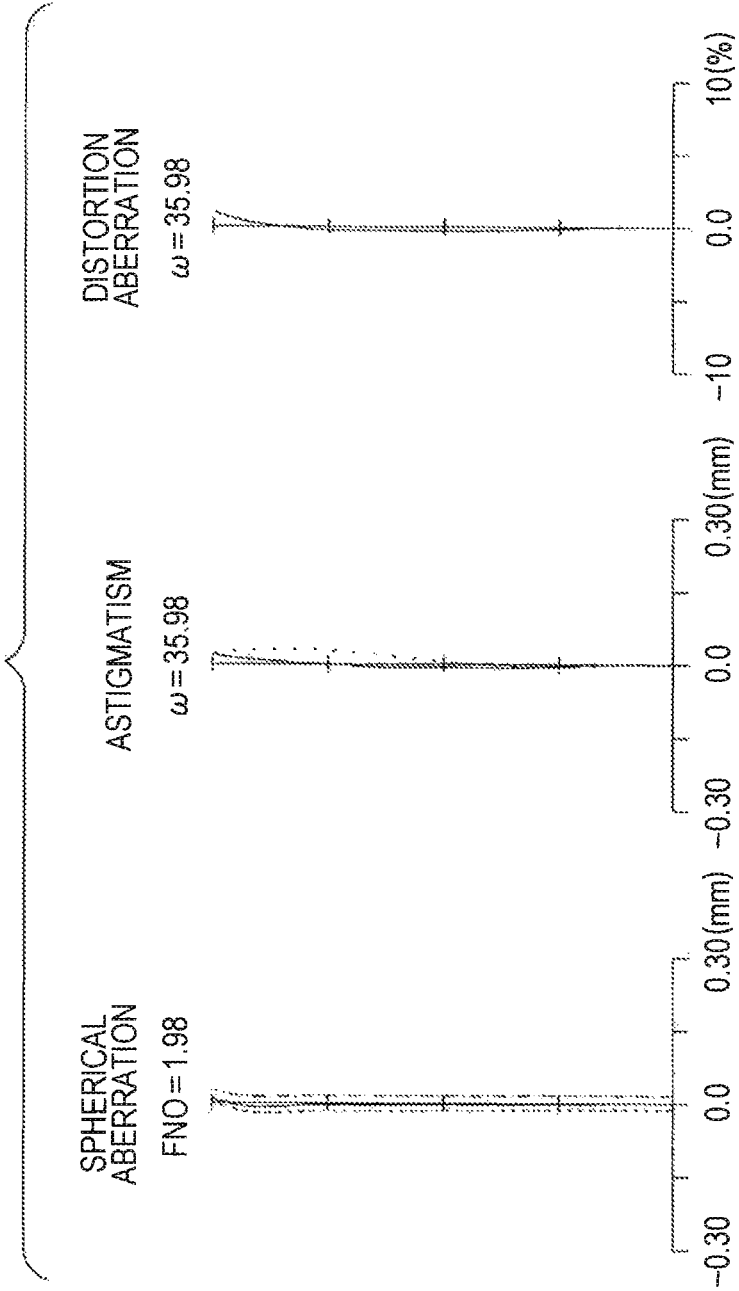
FIG. 22 shows a spherical aberration diagram, an astigmatism diagram, and a distortion aberration diagram at the time of focusing on infinity in the wide angle end focused state of the variable magnification optical system of Example 6.
Figure 23:
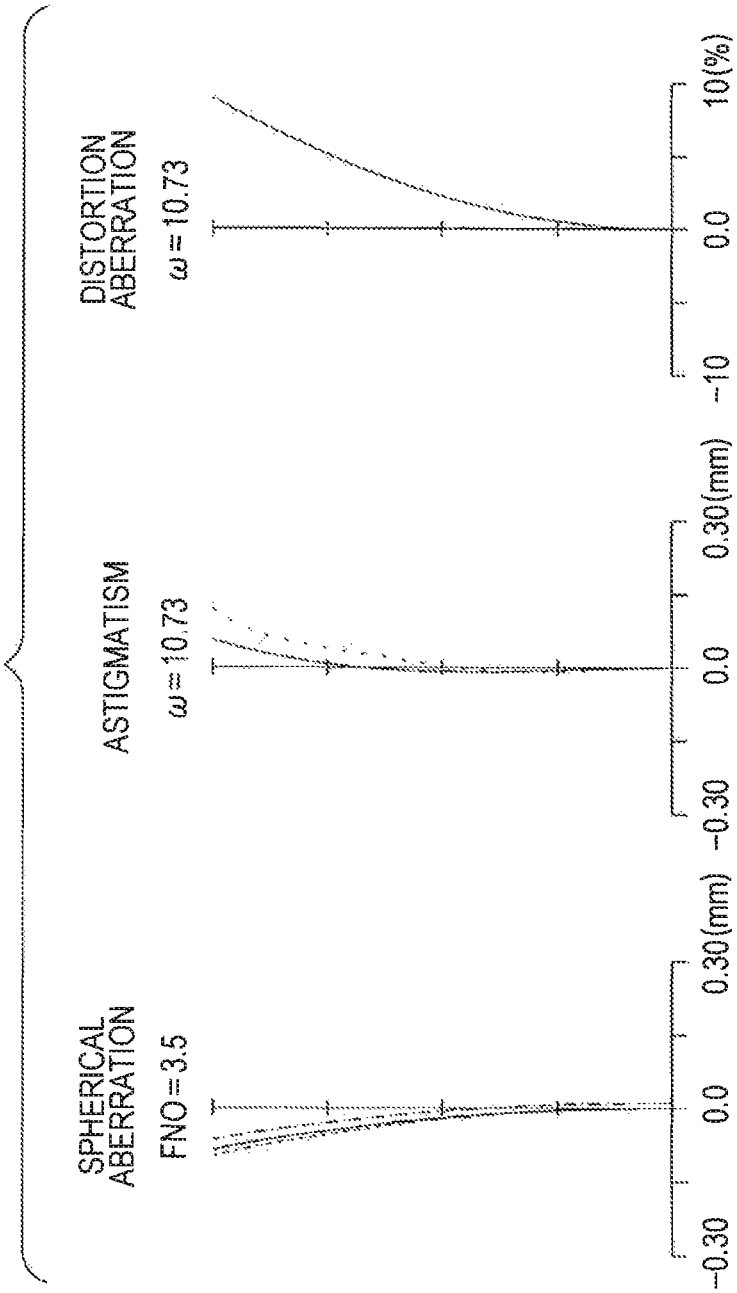
FIG. 23 shows a spherical aberration diagram, an astigmatism diagram, and a distortion aberration diagram at the time of focusing on infinity in the middle focus position focused state of the variable magnification optical system of Example 6.
Figure 24:
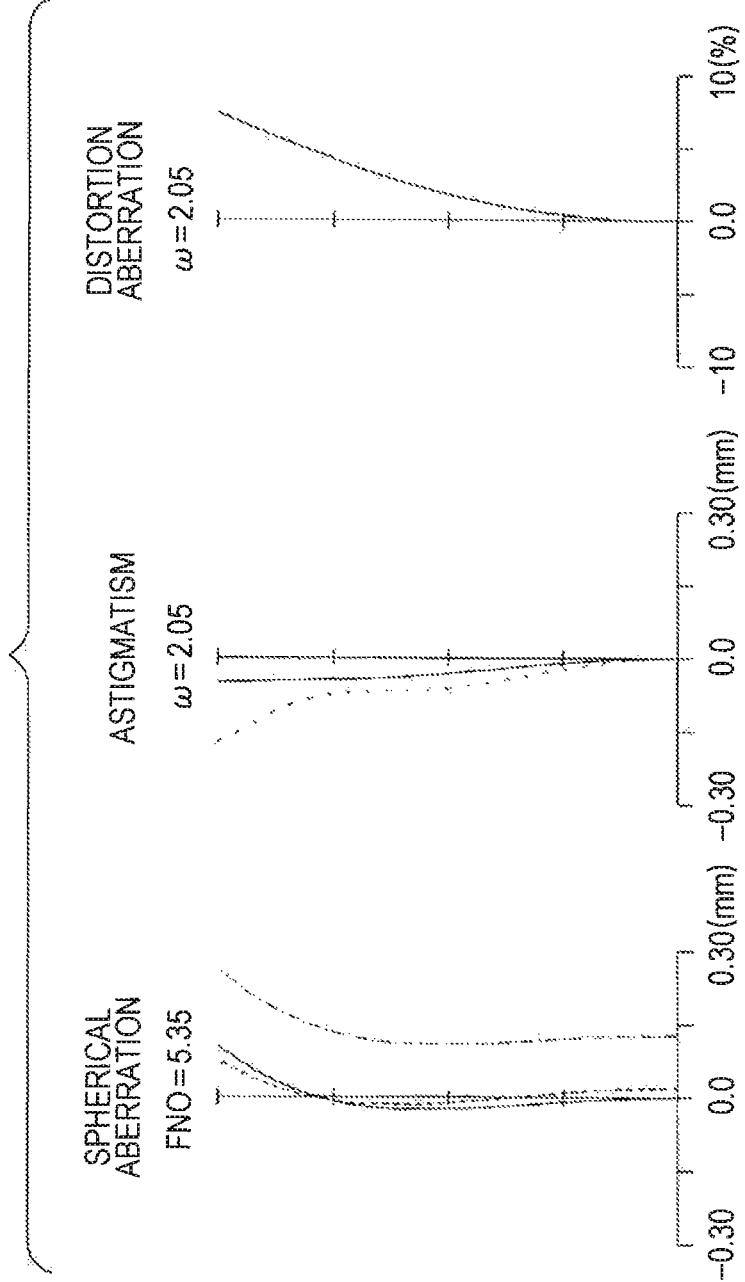
FIG. 24 shows a spherical aberration diagram, an astigmatism diagram, and a distortion aberration diagram at the time of focusing on infinity in the telephoto end focused state of the variable magnification optical system of Example 6.

Next, numerical examples which adopt detailed numerical values of the optical system will be described. Table 21 shows surface data of the zoom, lens and Tables 22 to 24 show aspherical data, various data, and focal lengths of respective lens groups. Further, Table 37 shows numerical values of the conditional expression (1) to the conditional expression (6) of the optical system. Further, FIGS. 22 to 24 show vertical aberration diagrams at the time of focusing on infinity in the wide angle end state, the middle focus position state, and the telephoto end state of the zoom lens.

TABLE 21

[SURFACE DATA]

| SURFACE NUMBER | r | d | Nd | vd |
|---|---|---|---|---|
| 1 | 58.601 | 0.750 | 2.0010 | 29.13 |
| 2 | 30.112 | 4.779 | 1.4970 | 81.61 |
| 3 | 506.06 | 0.075 | | |
| 4 | 33.429 | 3.086 | 1.4970 | 81.61 |
| 5 | 128.621 | 0.075 | | |
| 6 | 31.823 | 3.151 | 1.7292 | 54.67 |
| 7 | 118.712 | D(7) | | |
| 8* | 180.953 | 0.100 | 1.5141 | 49.72 |
| 9 | 81.109 | 0.700 | 1.8042 | 46.50 |
| 10 | 9.813 | 3.431 | | |
| 11 | −17.042 | 0.450 | 1.8348 | 42.72 |
| 12 | 12.683 | 0.221 | | |
| 13 | 13.926 | 1.862 | 1.9591 | 17.47 |
| 14 | 261.382 | D(14) | | |
| 15 | INF | 0.300 | | S |
| 16* | 11.079 | 2.731 | 1.5920 | 67.02 |
| 17* | 135.484 | 0.100 | | |
| 18 | 16.718 | 0.450 | 1.9037 | 31.31 |
| 19 | 11.775 | D(19) | | |
| 20* | 12.862 | 2.723 | 1.7290 | 54.04 |
| 21* | −99.218 | 0.051 | | |
| 22 | 27.443 | 0.450 | 1.9108 | 35.25 |
| 23 | 8.069 | 4.333 | 1.4970 | 81.61 |
| 24 | −26.493 | D(24) | | |
| 25 | −74.594 | 0.450 | 1.9108 | 35.25 |
| 26 | 6.522 | 2.252 | 1.8081 | 22.76 |
| 27 | 14.310 | D(27) | | |
| 28* | 22.182 | 1.738 | 1.5920 | 67.02 |
| 29* | −27.866 | D(29) | | |
| 30 | INF | 0.500 | 1.5163 | 64.14 |
| 31 | INF | 0.500 | | |

TABLE 22

[ASPHERICAL DATA]

| SURFACE NUMBER | k | A4 | A6 | A8 | A10 |
|---|---|---|---|---|---|
| 8 | 0.0000E+00 | 6.2154E−05 | −3.4311E−07 | 2.1207E−09 | 3.4048E−12 |
| 17 | −4.5149E−01 | −2.5140E−05 | 3.3729E−08 | 3.8428E−09 | 5.5616E−11 |
| 18 | 0.0000E+00 | 2.6180E−05 | 1.0036E−07 | 4.5871E−09 | 3.6735E−11 |
| 21 | 0.0000E+00 | −2.9559E−05 | 1.3974E−07 | −4.0202E−09 | 5.9782E−11 |
| 22 | 0.0000E+00 | 5.7259E−05 | −1.0308E−07 | −1.9049E−09 | 4.8949E−11 |
| 29 | 0.0000E+00 | 1.0282E−06 | 3.5117E−06 | −3.6484E−07 | 5.8483E−09 |
| 30 | 0.0000E+00 | 1.4277E−04 | 7.2358E−06 | −5.2733E−07 | 7.8539E−09 |

TABLE 23

[VARIOUS DATA]

| | WIDE ANGLE END | MIDDLE | TELEPHOTO END |
|---|---|---|---|
| F | 7.50 | 26.66 | 143.07 |
| Fno | 1.98 | 3.50 | 5.35 |
| ω | 35.98 | 10.73 | 2.05 |
| D(7) | 0.520 | 12.707 | 23.145 |
| D(14) | 23.575 | 11.388 | 0.950 |
| D(19) | 9.133 | 2.840 | 0.883 |
| D(24) | 4.181 | 6.513 | 0.600 |
| D(27) | 1.310 | 5.105 | 17.264 |
| D(29) | 6.023 | 6.189 | 1.900 |

TABLE 24

[FOCAL LENGTH OF EACH LENS GROUP]

| F1 | 37.028 |
|---|---|
| F2 | −7.414 |
| F3 | 32.516 |
| F4 | 16.109 |
| F5 | −11.546 |
| F6 | 21.135 |

Example 7

(1) Configuration of Optical System

Figure 25:
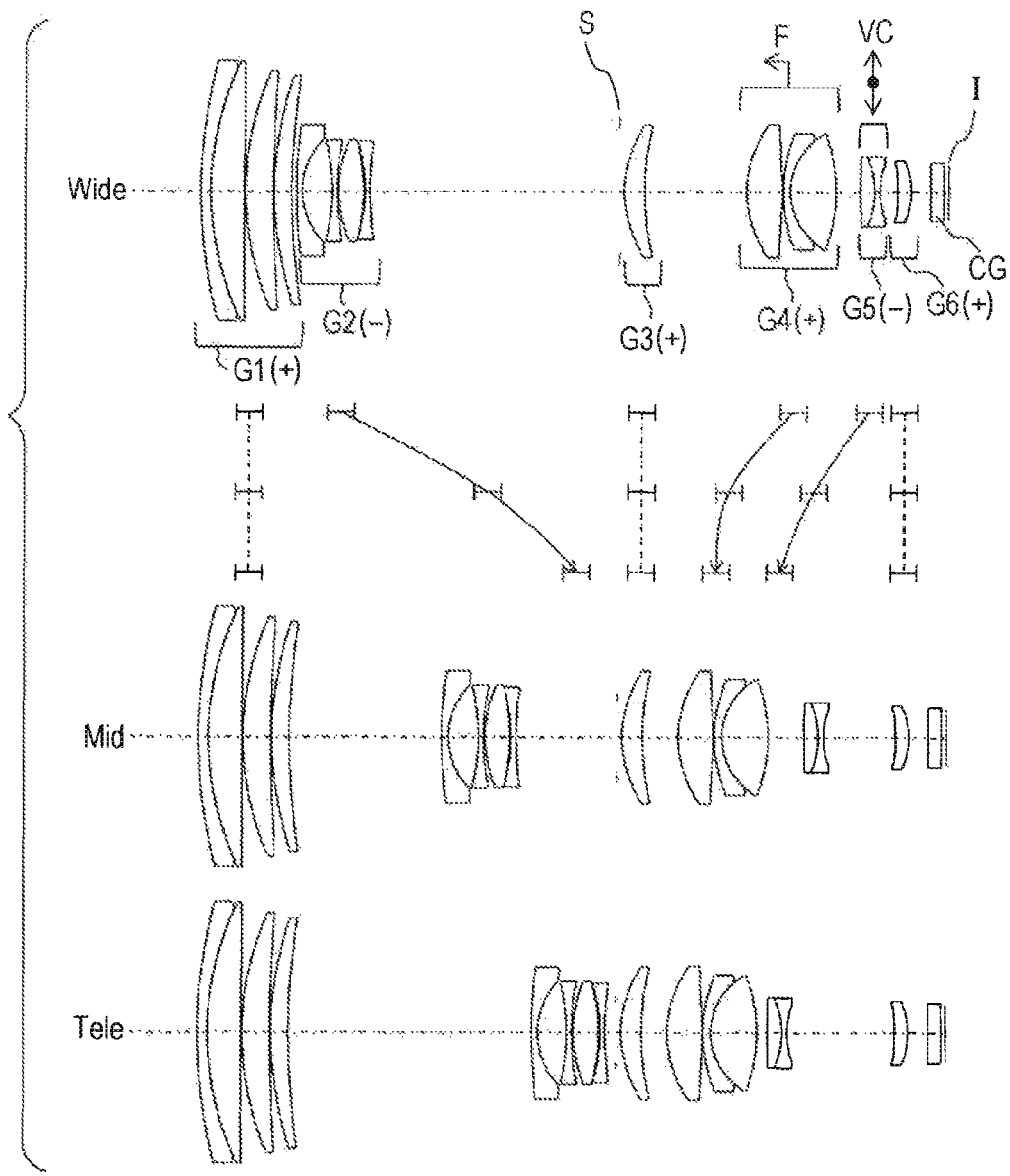
FIG. 25 is a cross-sectional view showing an example of a lens configuration of a variable magnification optical system of Example 7 of the present invention, where an upper stage indicates a wide angle end focused state, a middle stage indicates a middle focus position focused state, and a lower stage indicates a telephoto end focused state.
Figure 26:
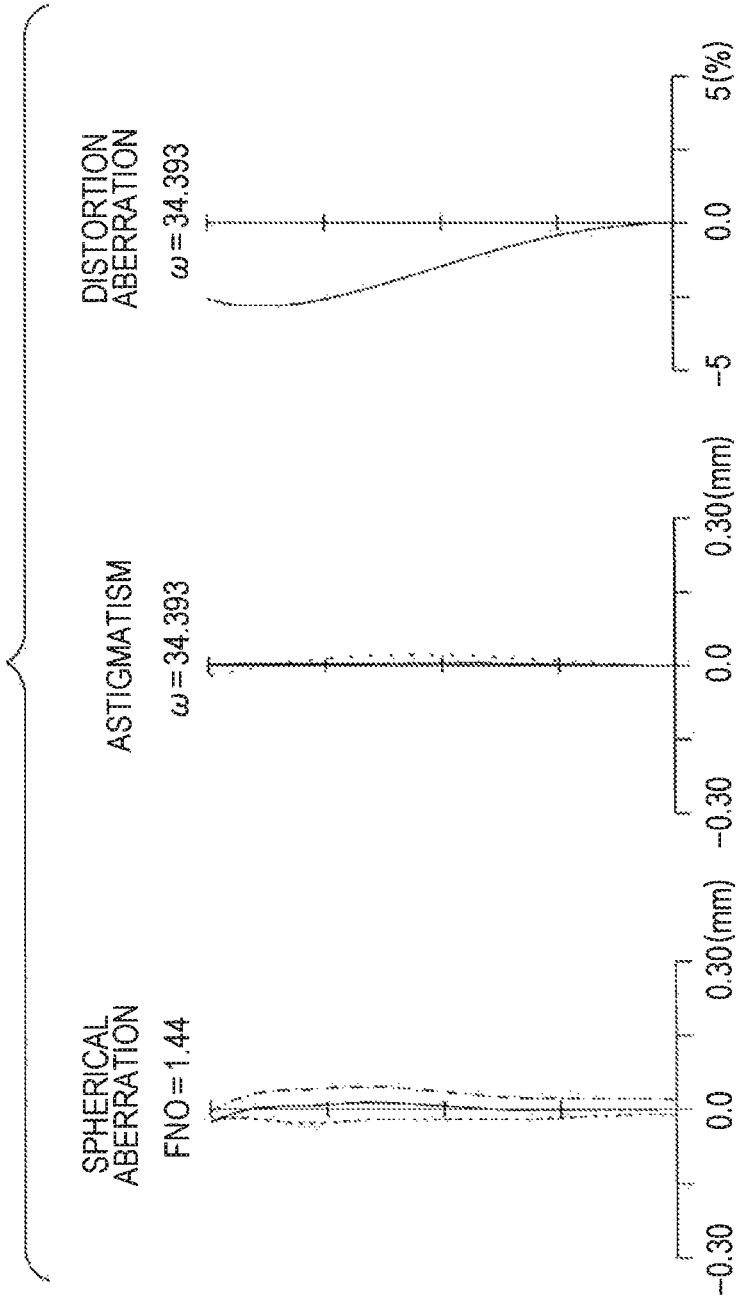
FIG. 26 shows a spherical aberration diagram, an astigmatism diagram, and a distortion aberration diagram at the time of focusing on infinity in the wide angle end focused state of the variable magnification optical system of Example 7.
Figure 27:
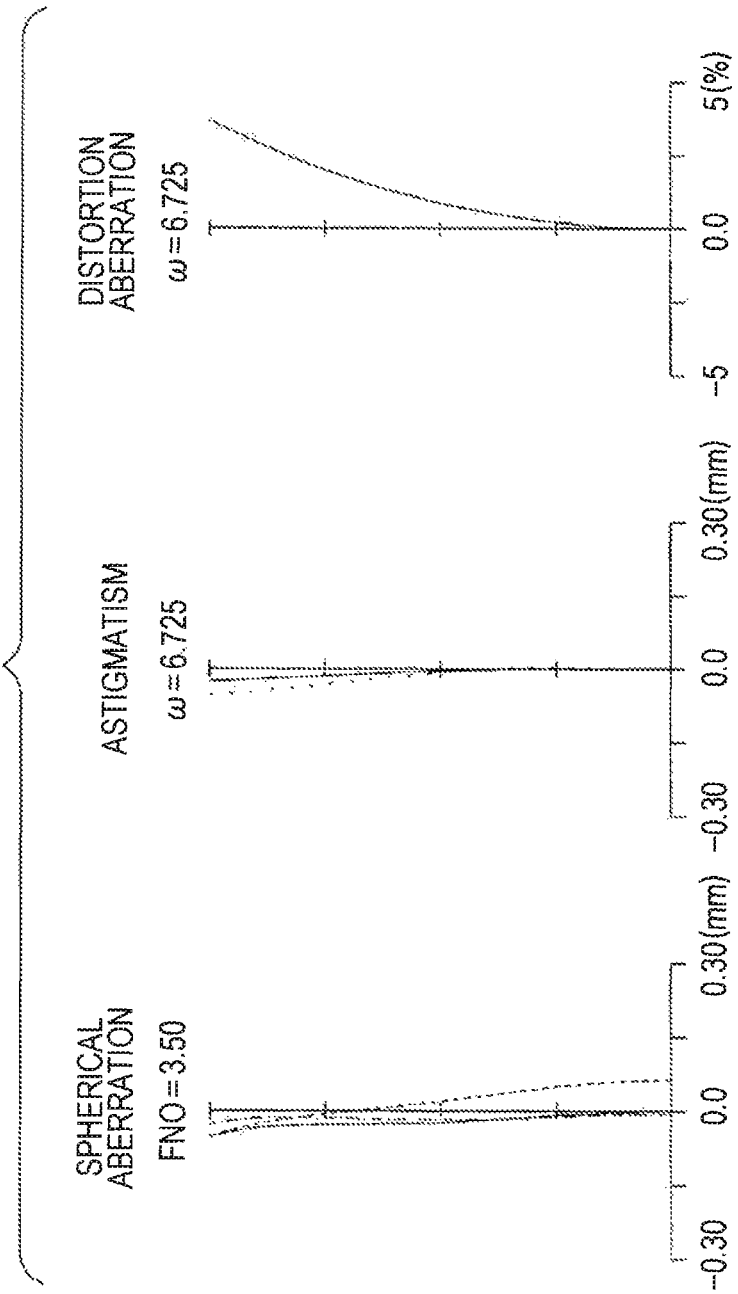
FIG. 27 shows a spherical aberration diagram, an astigmatism diagram, and a distortion aberration diagram at the time of focusing on infinity in the middle focus position focused state of the variable magnification optical system of Example 7.
Figure 28:
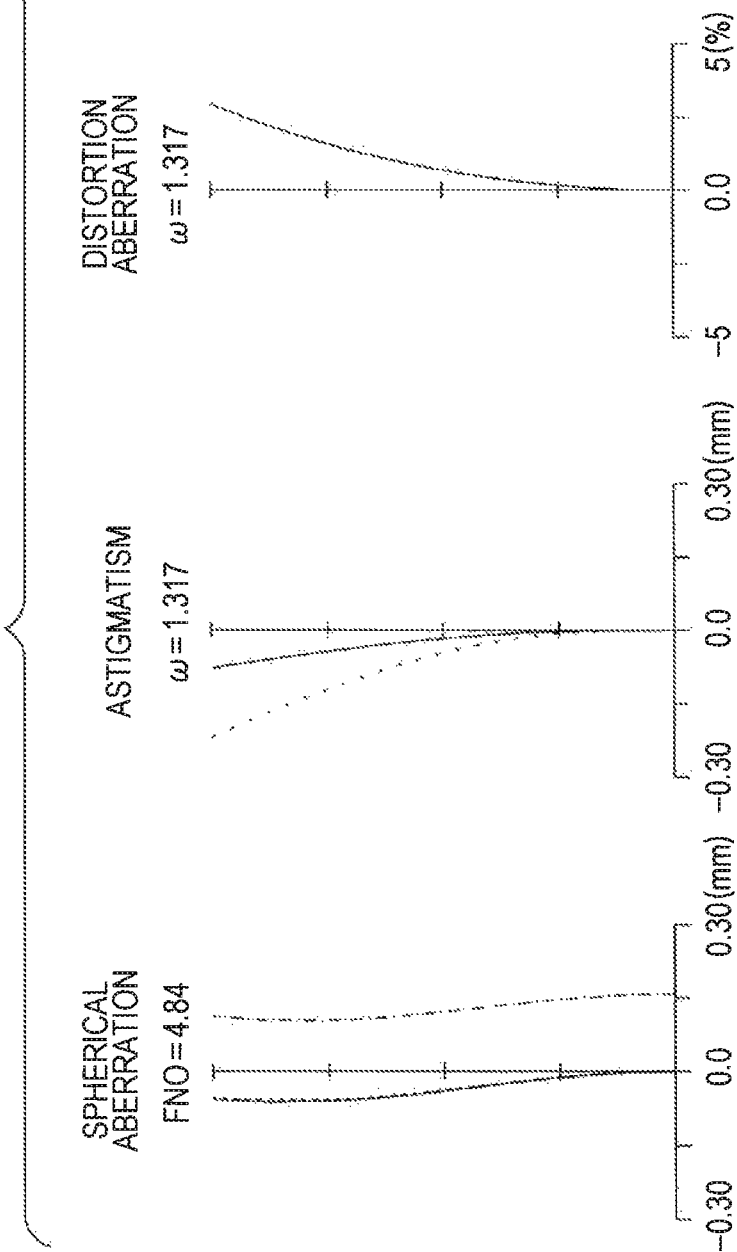
FIG. 28 shows a spherical aberration diagram, an astigmatism diagram, and a distortion aberration diagram at the time of focusing on infinity in the telephoto end focused state of the variable magnification optical system of Example 7.

FIG. 25 shows a lens configuration in a wide angle end state (Wide), a middle focus position state (Mid), and a telephoto end state (Tele) of a zoom lens which is an optical system of Example 7 according to the present invention.

The zoom lens of Example 7 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 25.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the object side, the fifth lens group G5 is moved toward the object side, and the sixth lens group G6 is fixed in the optical axis direction. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4 and the fifth lens group G5 respectively serve as compensators.

Further, in the zoom lens, when focusing from the infinite object to the close object, the fourth lens group G4 is moved along the optical axis toward the object side for the focusing operation. Further, the fifth lens group G5 is configured to be movable in a direction perpendicular to the optical axis and serves as a vibration-compensation lens group VC that corrects image blurring at the time of the image pickup operation.

(2) Numerical Example

Next, numerical examples which adopt detailed numerical values of the optical system will be described. Table 25 shows surface data of the zoom lens and Tables 26 to 28 show aspherical data, various data, and focal lengths of respective lens groups. Further, Table 37 shows numerical values of the conditional expression (1) to the conditional expression (6) of the optical system. Further, FIGS. 26 to 29 show vertical aberration diagrams at the time of focusing on infinity in the wide angle end state, the middle focus position state, and the telephoto end state of the zoom lens.

TABLE 25

[SURFACE DATA]

| SURFACE NUMBER | r | d | nd | vd | |
|---|---|---|---|---|---|
| 1 | 98.064 | 2.000 | 2.0010 | 29.13 | |
| 2 | 58.681 | 6.668 | 1.4970 | 81.61 | |
| 3 | 3655.953 | 0.200 | | | |
| 4 | 57.616 | 5.585 | 1.4970 | 81.61 | |
| 5 | 311.210 | 0.200 | | | |
| 6 | 69.678 | 3.505 | 1.7292 | 54.67 | |
| 7 | 139.139 | D(7) | | | |
| 8 | 107.306 | 1.200 | 2.0010 | 29.13 | |
| 9 | 14.458 | 5.983 | | | |
| 10 | −40.267 | 1.000 | 1.7292 | 54.67 | |
| 11 | 53.086 | 0.300 | | | |
| 12 | 26.119 | 5.007 | 1.9459 | 17.98 | |
| 13 | −36.904 | 0.300 | | | |
| 14 | −30.984 | 1.000 | 2.0010 | 29.13 | |
| 15 | 68.860 | D(15) | | | |
| 16 | ∞ | 1.000 | | | S |
| 17* | 21.950 | 4.087 | 1.4971 | 81.56 | |
| 18* | 56.100 | D(18) | | | |
| 19* | 21.853 | 6.943 | 1.5831 | 59.46 | |
| 20* | −70.247 | 0.200 | | | |
| 21 | 29.801 | 1.500 | 2.0010 | 29.13 | |
| 22 | 13.238 | 9.146 | 1.4970 | 81.61 | |
| 23 | −31.380 | D(23) | | | |
| 24 | 143.091 | 2.915 | 1.9212 | 23.96 | |
| 25 | −16.277 | 1.000 | 1.9108 | 35.25 | |
| 26 | 14.975 | D(26) | | | |
| 27* | −100.000 | 2.707 | 1.4971 | 81.56 | |
| 28* | −18.672 | 4.000 | | | |
| 29 | ∞ | 2.654 | 1.5168 | 64.20 | |
| 30 | ∞ | 1.000 | | | |

TABLE 26

[ASPHERICAL DATA]

| SURFACE NUMBER | k | A4 | A6 | A8 | A10 |
|---|---|---|---|---|---|
| 17 | −4.4395E−01 | −3.7553E−06 | 1.6776E−09 | −1.1755E−11 | −4.7616E−13 |
| 18 | −9.0227E−01 | 6.0989E−06 | 1.4081E−08 | −1.1203E−10 | −2.1786E−13 |
| 19 | −1.0198E+00 | 3.3559E−06 | 2.4007E−08 | 6.7834E−11 | −3.6724E−13 |
| 20 | −2.8358E+00 | 2.5316E−05 | −1.1141E−08 | 1.0551E−11 | −3.0114E−13 |
| 27 | 5.4465E+00 | −2.9410E−04 | 1.6163E−06 | −1.0374E−07 | 8.4616E−16 |
| 28 | −1.0000E+01 | −4.3502E−04 | 3.9455E−06 | −1.0391E−07 | 7.5032E−10 |

TABLE 27

[VARIOUS DATA]

| | WIDE ANGLE END | MIDDLE | TELEPHOTO END |
|---|---|---|---|
| F | 8.248 | 45.003 | 232.475 |
| Fno | 1.440 | 3.500 | 4.840 |
| ω | 34.393 | 6.725 | 1.317 |
| D(7) | 1.000 | 30.715 | 48.694 |
| D(15) | 49.920 | 20.205 | 2.226 |
| D(18) | 20.407 | 7.286 | 5.262 |
| D(23) | 5.027 | 7.103 | 2.000 |
| D(26) | 3.546 | 14.591 | 21.719 |

TABLE 28

[FOCAL LENGTH OF EACH LENS GROUP]

| F1 | 73.235 |
|---|---|
| F2 | −11.744 |
| F3 | 69.765 |
| F4 | 23.847 |
| F5 | −18.891 |
| F6 | 45.680 |

Example 8

(1) Configuration of Optical System

Figure 29:
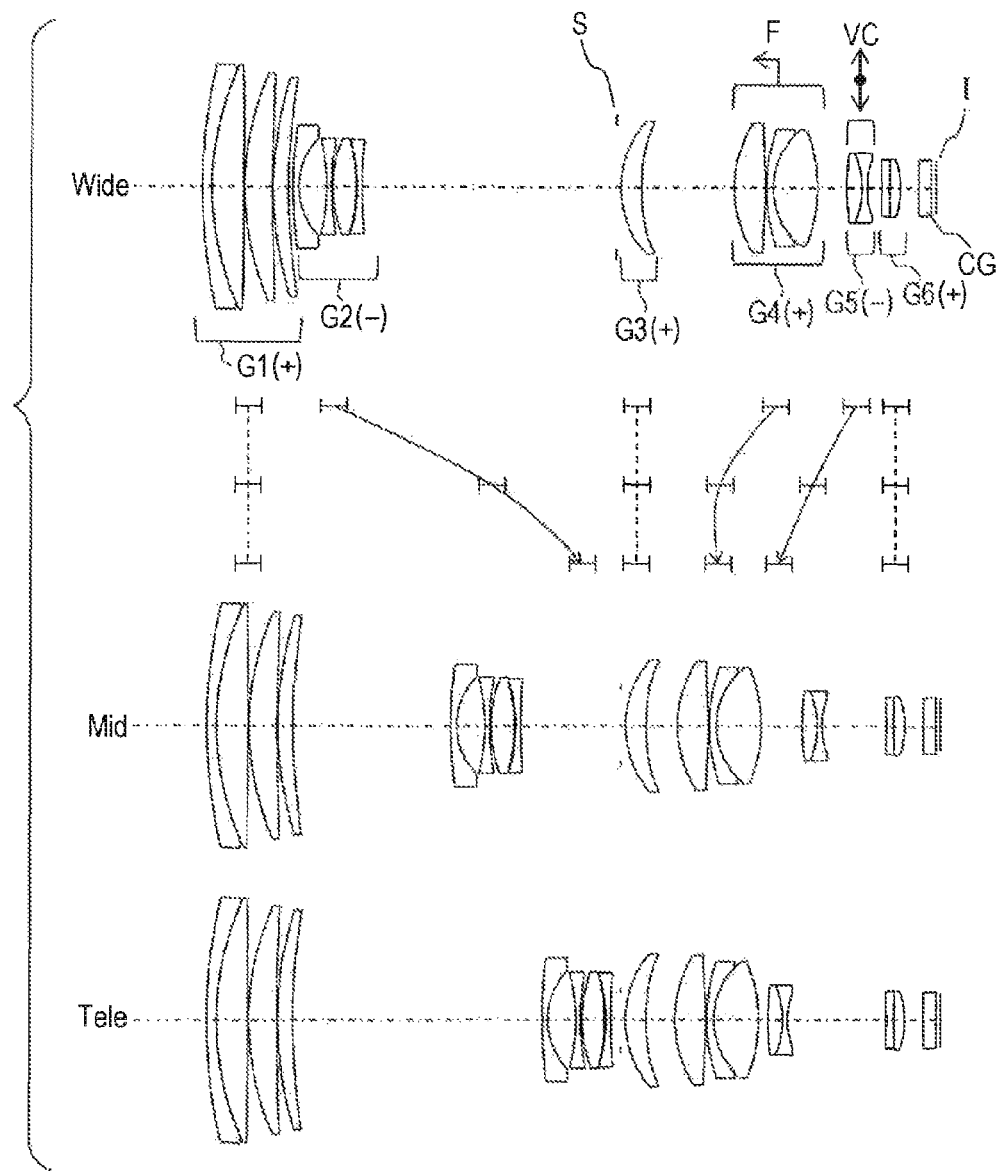
FIG. 29 is a cross-sectional view showing an example of a lens configuration of a variable magnification optical system of Example 8 of the present invention, where an upper stage indicates a wide angle end focused state, a middle stage indicates a middle focus position focused state, and a lower stage indicates a telephoto end focused state.

FIG. 29 shows a lens configuration in a wide angle end state (Wide), a middle focus position state (Mid), and a telephoto end state (Tele) of a zoom lens which is an optical system of Example 8 according to the present invention.

The zoom lens of Example 8 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 29.

In the zoom lens, when zooming from the wide angle end to the telephoto end, the first lens group G1 is fixed in the optical axis direction, the second lens group G2 is moved toward the image side, the third lens group G3 is fixed in the optical axis direction, the fourth lens group G4 is moved toward the object side, the fifth lens group G5 is moved toward the object side, and the sixth lens group G6 is fixed in the optical axis direction. Further, the aperture stop S is disposed on the object side of the third lens group G3 and the aperture stop S is fixed in the optical axis direction along with the third lens group G3 upon zooming. Additionally, the second lens group G2 is a variator and the fourth lens group G4 and the fifth lens group G5 respectively serve as compensators.

Further, in the zoom lens, when focusing from the infinite object to the close object, the fourth lens group G4 is moved along the optical axis toward the object side for the focusing operation. Further, the fifth lens group G5 is configured to be movable in a direction perpendicular to the optical axis and serves as a vibration-compensation lens group VC that corrects image blurring at the time of the image pickup operation.

(2) Numerical Example

Figure 30:
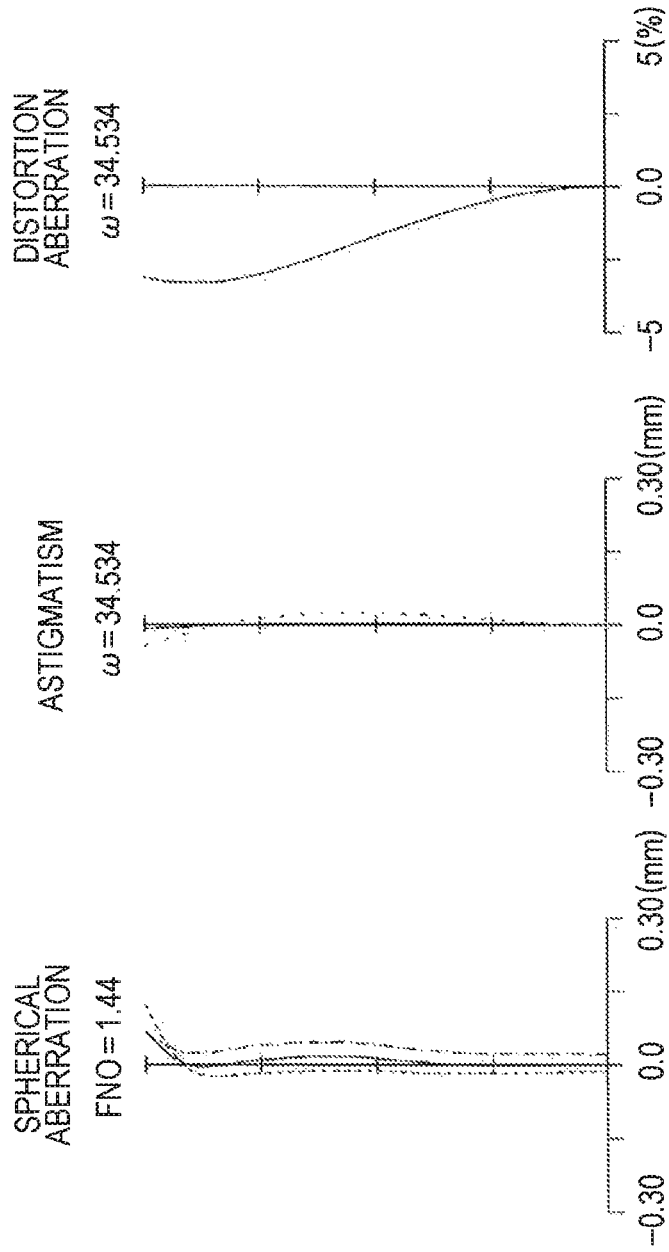
FIG. 30 shows a spherical aberration diagram, an astigmatism diagram, and a distortion aberration diagram at the time of focusing on infinity in the wide angle end focused state of the variable magnification optical system of Example 8.
Figure 31:
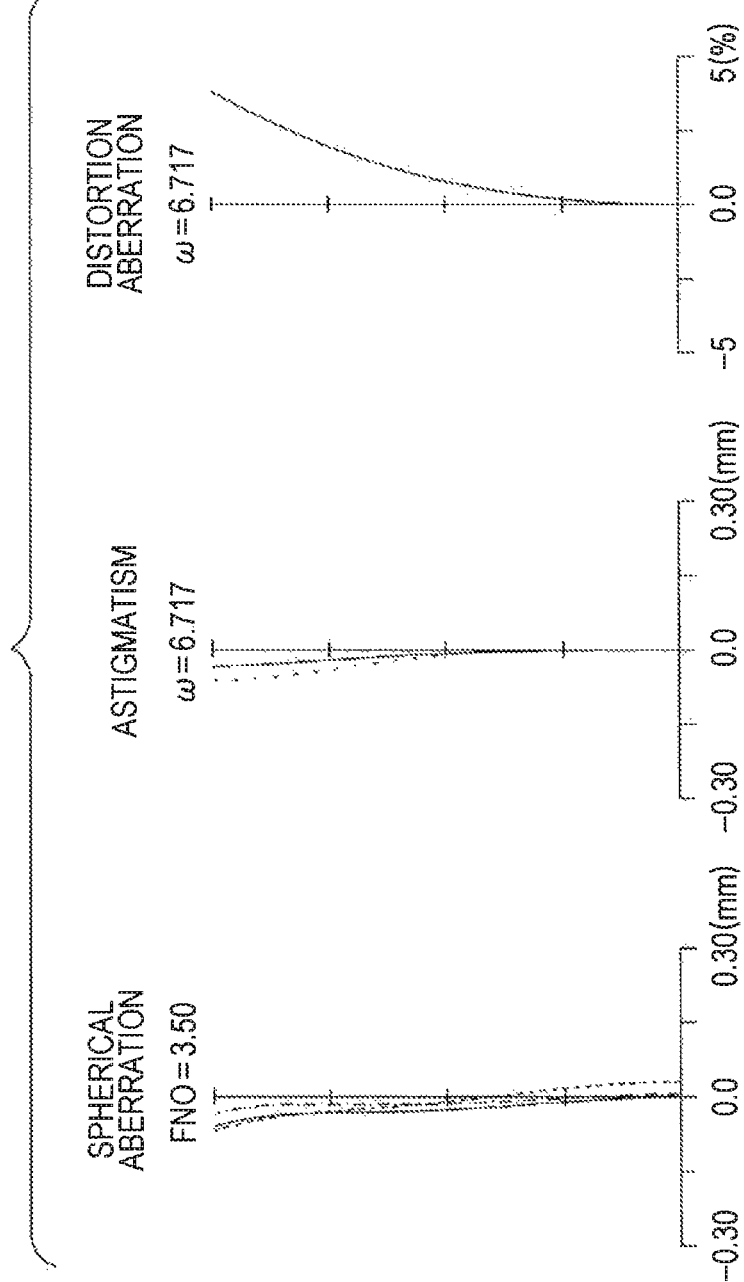
FIG. 31 shows a spherical aberration diagram, an astigmatism diagram, and a distortion aberration diagram at the time of focusing on infinity in the middle focus position focused state of the variable magnification optical system of Example 8.
Figure 32:
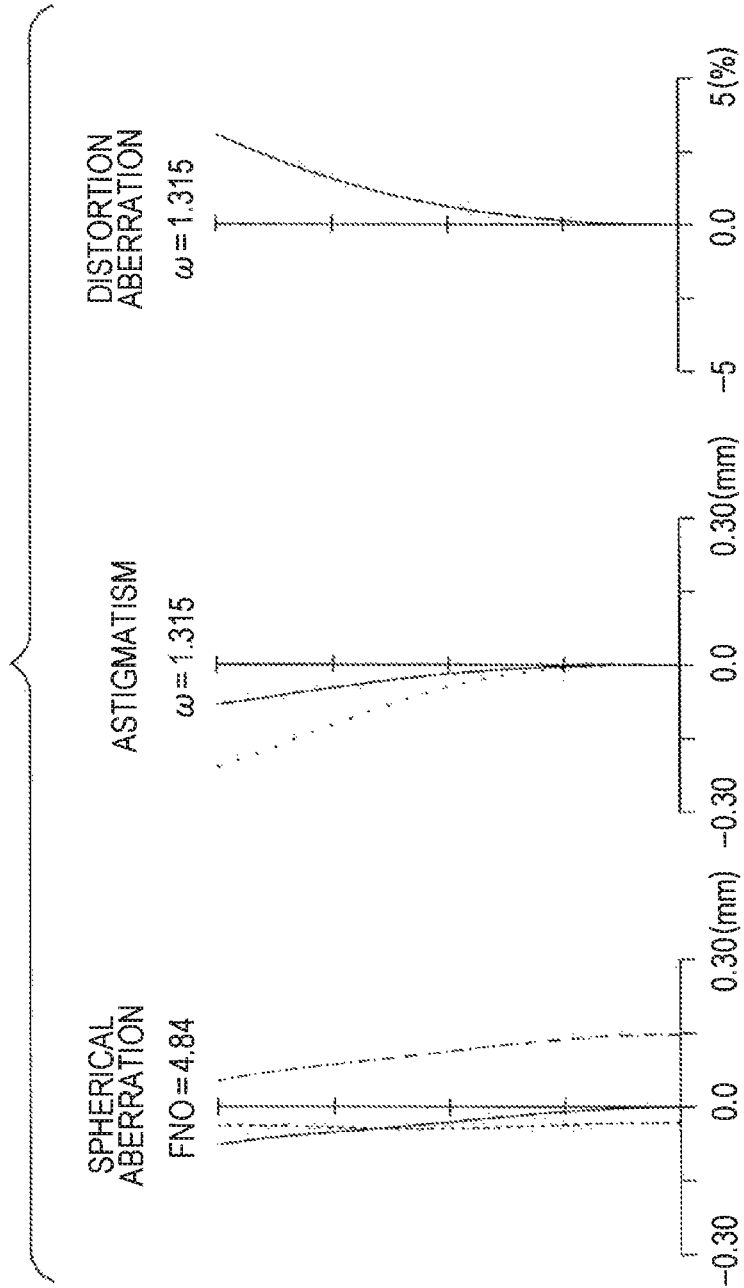
FIG. 32 shows a spherical aberration diagram, an astigmatism diagram, and a distortion aberration diagram at the time of focusing on infinity in the telephoto end focused state of the variable magnification optical system of Example 8.

Next, numerical examples which adopt detailed numerical values of the optical system will be described. Table 29 shows surface data of the zoom lens and Tables 30 to 32 show aspherical data, various data, and focal lengths of respective lens groups. Further, Table 37 shows numerical values of the conditional expression (1) to the conditional expression (6) of the optical system. Further, FIGS. 30 to 32 show vertical aberration diagrams at the time of focusing on infinity in the wide angle end state, the middle focus position state, and the telephoto end state of the zoom lens.

TABLE 29

[SURFACE DATA]

| SURFACE NUMBER | r | d | nd | vd |
|---|---|---|---|---|
| 1 | 111.334 | 2.000 | 1.9537 | 32.32 |
| 2 | 58.822 | 6.697 | 1.4970 | 81.61 |
| 3 | −2086.398 | 0.200 | | |
| 4 | 57.340 | 5.901 | 1.4970 | 81.61 |
| 5 | 449.062 | 0.200 | | |
| 6 | 75.099 | 3.218 | 1.7292 | 54.67 |
| 7 | 138.778 | D(7) | | |
| 8 | 104.308 | 1.200 | 2.0010 | 29.13 |
| 9 | 14.638 | 5.901 | | |
| 10 | −37.636 | 1.000 | 1.7292 | 54.67 |
| 11 | 53.411 | 0.300 | | |
| 12 | 27.644 | 4.800 | 1.9459 | 17.98 |
| 13 | −38.032 | 0.353 | | |
| 14 | −30.745 | 1.000 | 2.0010 | 29.13 |
| 15 | 109.096 | D(15) | | |
| 16 | ∞ | 1.000 | | S |
| 17* | 21.106 | 4.397 | 1.4971 | 81.56 |
| 18* | 49.159 | D(18) | | |
| 19* | 24.797 | 6.530 | 1.5831 | 59.46 |
| 20* | −76.276 | 0.200 | | |
| 21 | 37.048 | 1.500 | 2.0010 | 29.13 |
| 22 | 15.629 | 9.315 | 1.4970 | 81.61 |
| 23 | −30.566 | D(23) | | |
| 24 | 55.645 | 3.176 | 1.9212 | 23.96 |
| 25 | −18.002 | 1.000 | 1.9537 | 32.32 |
| 26 | 16.168 | D(26) | | |
| 27 | −150.000 | 1.553 | 1.5688 | 56.04 |
| 28 | 92.609 | 0.200 | | |
| 29* | 68.242 | 2.241 | 1.4971 | 81.56 |
| 30* | −24.967 | 4.000 | | |
| 31 | ∞ | 2.654 | 1.5168 | 64.20 |
| 32 | ∞ | 1.000 | | |

TABLE 30

[ASPHERICAL DATA]

| SURFACE NUMBER | k | A4 | A6 | A8 | A10 |
|---|---|---|---|---|---|
| 17 | 7.5684E−01 | −1.1946E−05 | −3.9715E−08 | 1.7049E−10 | −1.0157E−12 |
| 18 | 9.9900E+00 | 4.4446E−06 | 1.3167E−08 | 1.7678E−10 | −7.4140E−13 |
| 19 | −1.1798E+00 | 2.5693E−06 | 1.5111E−08 | 1.4393E−10 | −6.9087E−13 |
| 20 | 5.9733E+00 | 2.3937E−05 | 9.6137E−10 | 6.7592E−11 | −5.7374E−13 |
| 29 | −1.9676E+00 | −3.3227E−04 | 4.7626E−06 | −1.5430E−07 | 1.3494E−09 |
| 30 | 1.4888E+00 | −3.1248E−04 | 5.8871E−06 | −1.5322E−07 | 1.2385E−09 |

TABLE 31

[VARIOUS DATA]

| | WIDE ANGLE END | MIDDLE | TELEPHOTO END |
|---|---|---|---|
| F | 8.248 | 45.007 | 232.504 |
| Fno | 1.440 | 3.500 | 4.840 |
| ω | 34.534 | 6.717 | 1.315 |
| D(7) | 1.000 | 33.288 | 52.437 |
| D(15) | 53.572 | 21.285 | 2.135 |
| D(18) | 19.552 | 6.674 | 6.114 |
| D(23) | 6.162 | 8.677 | 1.999 |
| D(26) | 3.180 | 13.542 | 20.780 |

TABLE 32

[FOCAL LENGTH OF EACH LENS GROUP]

| F1 | 76.893 |
|---|---|
| F2 | −12.274 |
| F3 | 70.724 |
| F4 | 26.156 |
| F5 | −23.734 |
| F6 | 57.236 |

Example 9

(1) Configuration of Optical System

Figure 33:
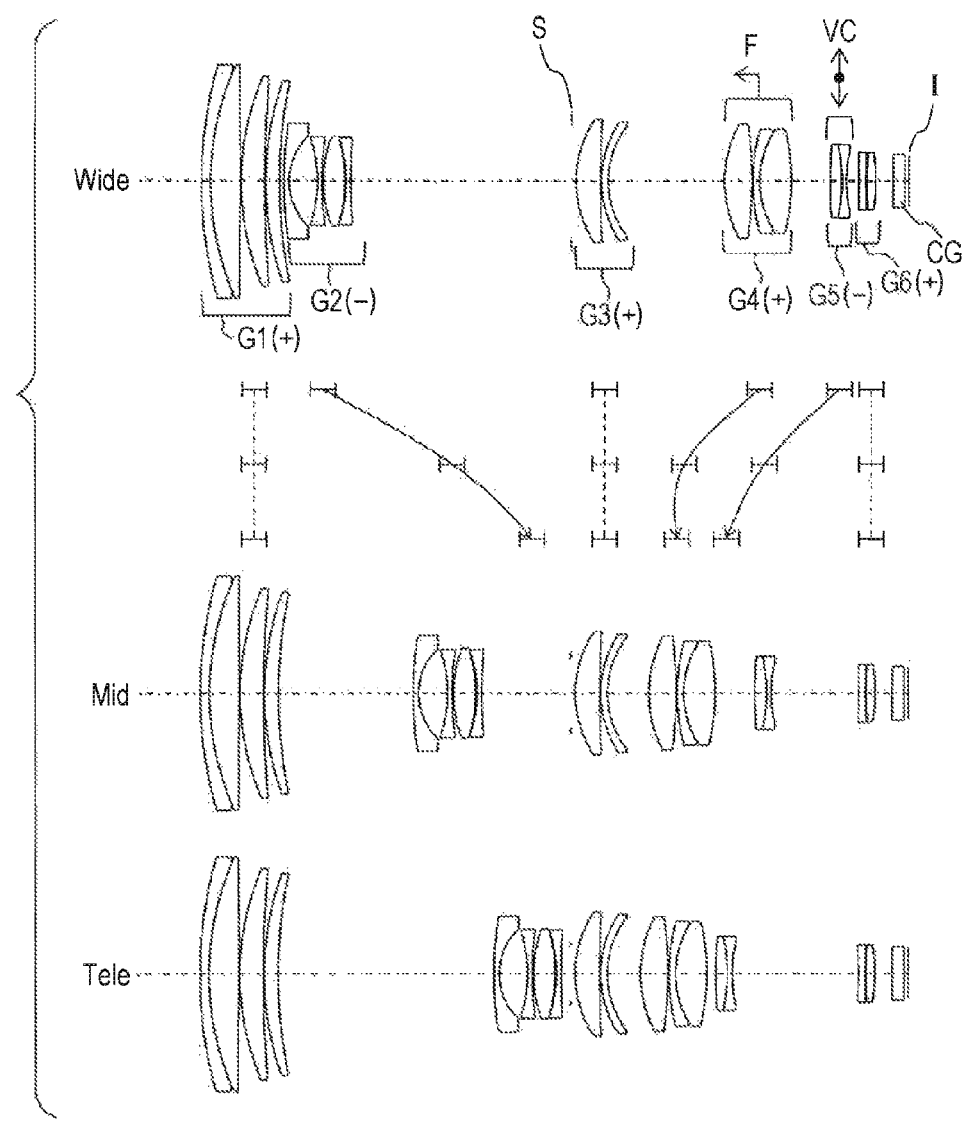
FIG. 33 is a cross-sectional view showing an example of a lens configuration of a variable magnification optical system of Example 9 of the present invention, where an upper stage indicates a wide single end focused state, a middle stage indicates a middle focus position focused state, and a lower stage indicates a telephoto end focused state.

FIG. 33 shows a lens configuration in a wide angle end state (Wide), a middle focus position state (Mid), and a telephoto end state (Tele) of a zoom lens which is an optical system of Example 9 according to the present invention.

The zoom lens of Example 9 includes a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power in order from an object side. A detailed lens configuration is shown in FIG. 33.

In the zoom lens, when zooming from the wide angle end to the telephoto end, the first lens group G1 is fixed in the optical axis direction, the second lens group G2 is moved, toward the image side, the third lens group G3 is fixed in the optical axis direction, the fourth lens group G4 is moved toward the object side, the fifth lens group G5 is moved toward the object side, and the sixth lens group G6 is fixed in the optical axis direction. Further, the aperture stop S is disposed on the object side of the third lens group G3 and the aperture stop S is fixed in the optical axis direction together with the third lens group G3 upon zooming. Additionally, the second lens group G2 is a variator and the fourth lens group G4 and the fifth lens group G5 respectively serve as compensators.

Further, in the zoom lens, when focusing from the infinite object to the close object, the fourth lens group G4 is moved along the optical axis toward the object side for the focusing operation. Further, the fifth lens group G5 is configured to be movable in a direction perpendicular to the optical axis and serves as a vibration-compensation lens group VC that corrects image blurring at the time of the image pickup operation.

(2) Numerical Example

Figure 34:
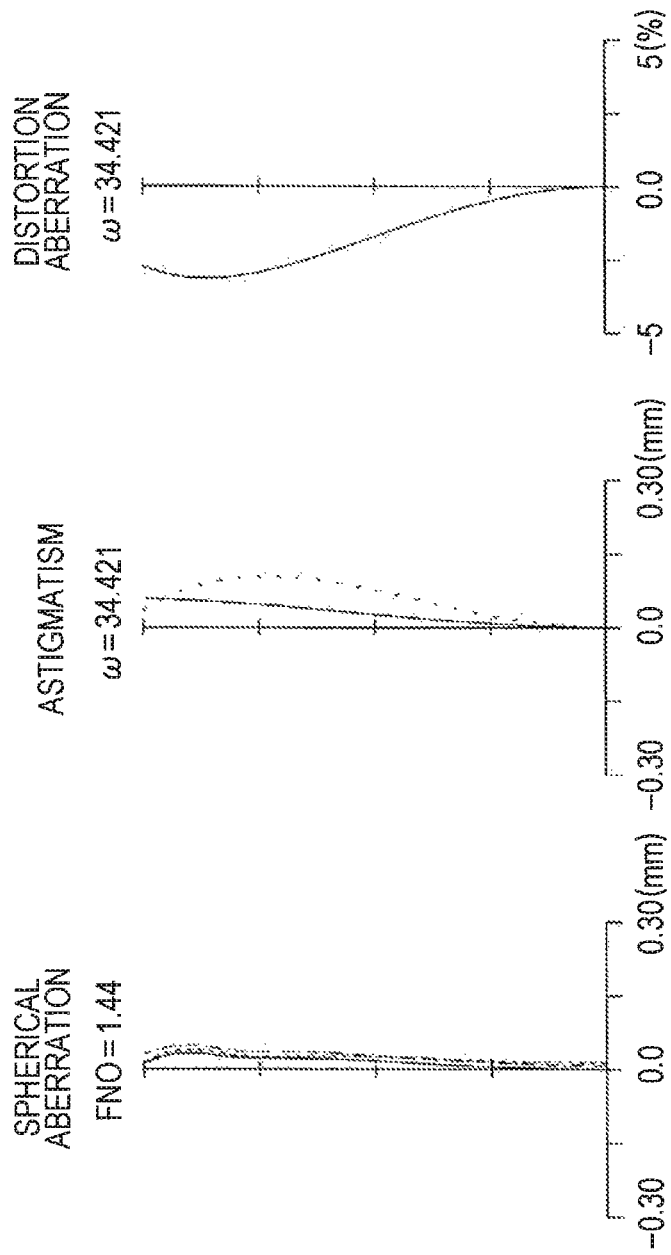
FIG. 34 shows a spherical aberration diagram, an astigmatism diagram, and a distortion aberration diagram at the time of focusing on infinity in the wide angle end focused state of the variable magnification optical system of Example 9.
Figure 35:
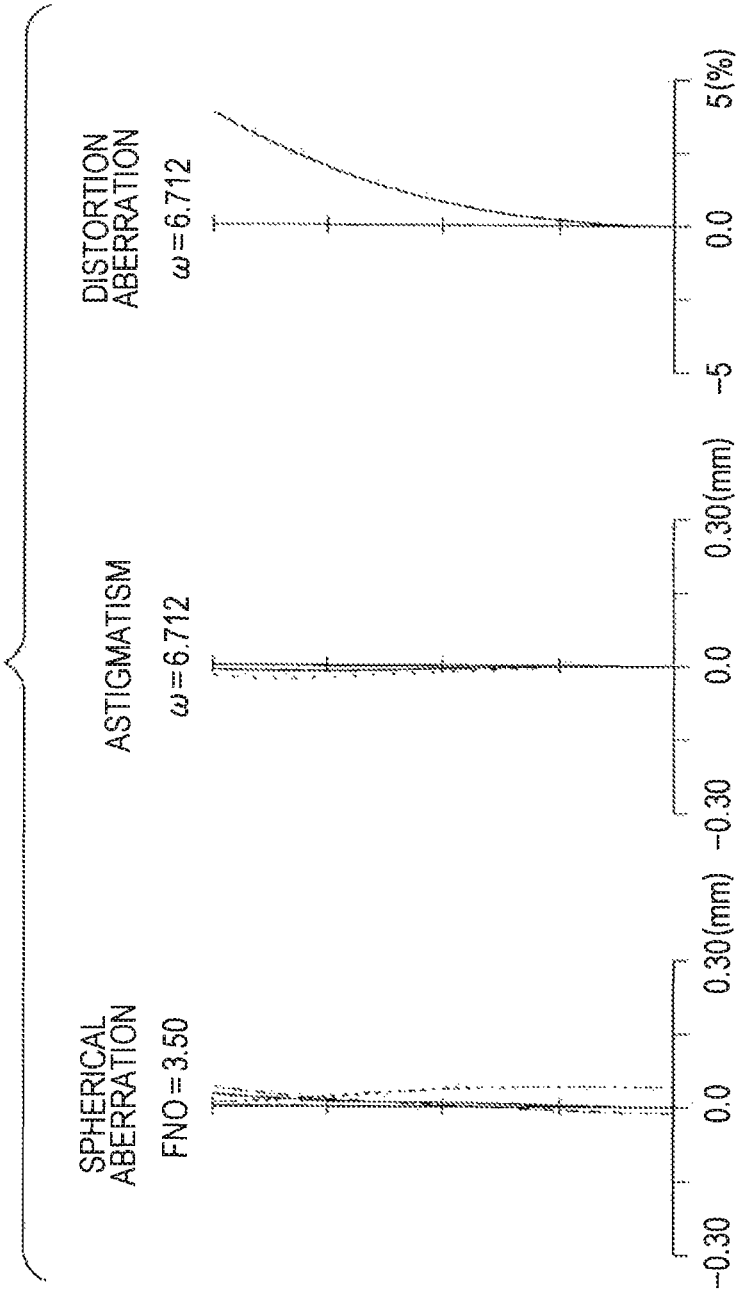
FIG. 35 shows a spherical aberration diagram, an astigmatism diagram, and a distortion aberration diagram at the time of focusing on infinity in the middle focus position focused state of the variable magnification optical system of Example 9.
Figure 36:
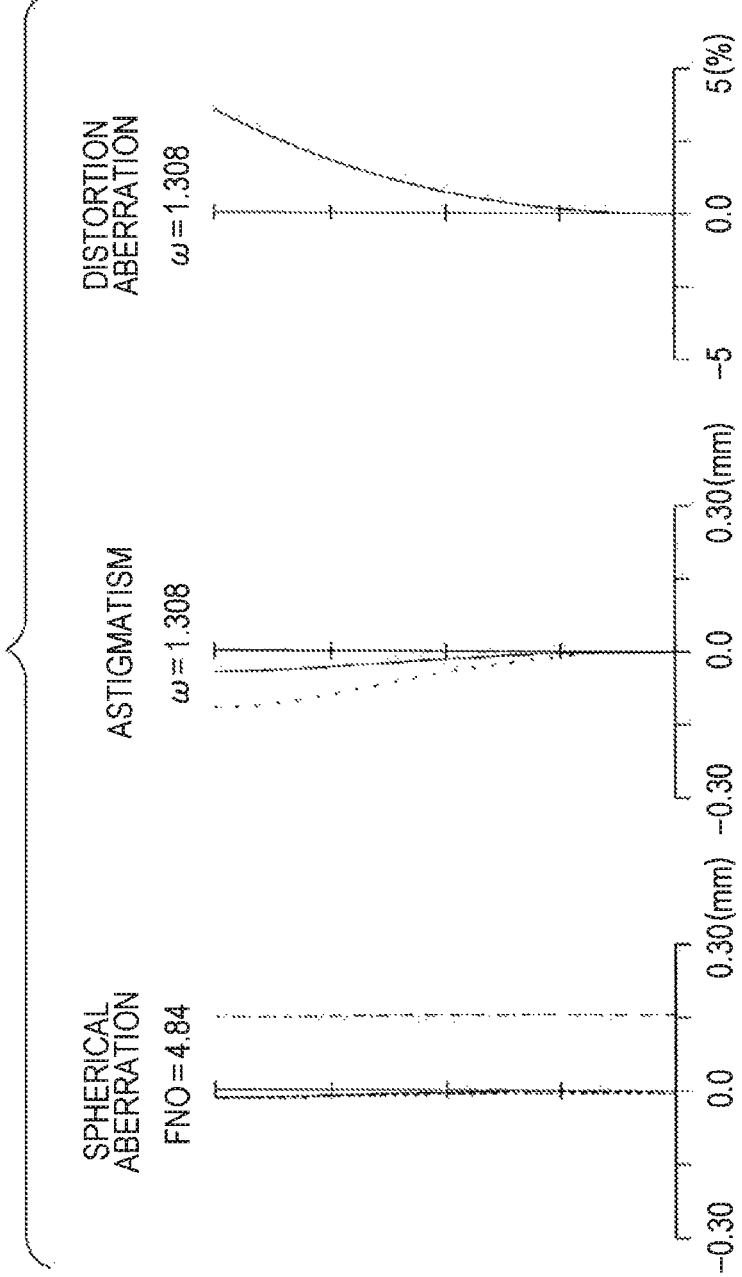
FIG. 36 shows a spherical aberration diagram, an astigmatism diagram, and a distortion aberration diagram at the time of focusing on infinity in the telephoto end focused state of the variable magnification optical system of Example 9.

Next, numerical examples which adopt detailed numerical values of the optical system will be described. Table 33 shows surface data of the zoom lens and Tables 34 to 36 show aspherical data, various data, and focal lengths of respective lens groups. Further, Table 37 shows numerical values of the conditional expression (1) to the conditional expression (6) of the optical system. Further, FIGS. 34 to 36 show vertical aberration diagrams at the time of focusing on infinity in the wide angle end state, the middle focus position state, and the telephoto end state of the zoom lens.

TABLE 33

SURFACE DATA

| SURFACE NUMBER | r | d | nd | vd |
|---|---|---|---|---|
| 1 | 95.585 | 2.000 | 2.0006 | 25.46 |
| 2 | 62.869 | 6.709 | 1.4970 | 81.61 |
| 3 | −1929.561 | 0.200 | | |
| 4 | 58.034 | 5.358 | 1.4970 | 81.61 |
| 5 | 272.091 | 0.200 | | |
| 6 | 66.499 | 3.133 | 1.7292 | 54.67 |
| 7 | 107.946 | D(7) | | |
| 8 | 82.227 | 1.200 | 2.0010 | 29.13 |
| 9 | 13.606 | 6.462 | | |
| 10 | −29.598 | 1.000 | 1.7292 | 54.67 |
| 11 | 68.260 | 0.300 | | |
| 12 | 28.109 | 4.884 | 1.9459 | 17.98 |
| 13 | −33.733 | 0.358 | | |
| 14 | −27.775 | 1.000 | 2.0019 | 29.13 |
| 15 | 110.093 | D(15) | | |
| 16 | ∞ | 1.000 | | S |
| 17* | 23.860 | 5.609 | 1.4971 | 81.56 |
| 18* | 1728.843 | 0.200 | | |
| 19 | 23.830 | 1.500 | 2.0010 | 29.13 |
| 20 | 19.922 | D(20) | | |
| 21* | 25.802 | 6.238 | 1.5533 | 71.68 |
| 22* | −69.756 | 0.200 | | |
| 23 | 43.865 | 1.500 | 2.0010 | 29.13 |
| 24 | 20.579 | 7.094 | 1.4970 | 81.61 |

TABLE 33-continued

SURFACE DATA

| SURFACE NUMBER | r | d | nd | vd |
|---|---|---|---|---|
| 25 | −48.071 | D(25) | | |
| 26 | 92.224 | 2.624 | 2.0027 | 19.32 |
| 27 | −36.395 | 1.000 | 2.0010 | 29.13 |
| 28 | 27.352 | D(28) | | |
| 29 | −150.000 | 1.585 | 2.0006 | 25.46 |
| 30 | 104.099 | 0.200 | | |
| 31* | 33.057 | 2.054 | 1.4971 | 81.56 |
| 32* | −58.693 | 4.000 | | |
| 33 | ∞ | 2.654 | 1.5168 | 64.20 |
| 34 | ∞ | 1.000 | | |

TABLE 34

[ASPHERICAL DATA]

| SURFACE NUMBER | k | A4 | A6 | A8 | A10 |
|---|---|---|---|---|---|
| 17 | 8.4488E−01 | −1.3547E−05 | 4.5017E−09 | −1.5091E−10 | 4.3789E−14 |
| 18 | 1.0000E+01 | 5.3425E−05 | 5.3876E−08 | −3.1757E−10 | 8.7900E−13 |
| 21 | −1.3621E+00 | 1.0129E−06 | 4.6214E−08 | −2.7576E−10 | 1.0928E−12 |
| 22 | 4.7312E−01 | 1.0097E−05 | 1.9152E−08 | −1.5264E−10 | 7.9473E−13 |
| 31 | 1.6608E+00 | −2.1259E−04 | 2.8138E−06 | −5.5204E−08 | −2.1478E−10 |
| 32 | −7.5653E+00 | −1.8327E−04 | 4.4861E−06 | −7.8618E−08 | 3.2448E−11 |

TABLE 35

[VARIOUS DATA]

| | WIDE ANGLE END | MIDDLE | TELEPHOTO END |
|---|---|---|---|
| F | 8.247 | 44.997 | 232.535 |
| Fno | 1.440 | 3.500 | 4.840 |
| ω | 34.421 | 6.712 | 1.308 |
| D(7) | 1.000 | 30.558 | 48.554 |
| D(15) | 49.702 | 20.144 | 2.147 |
| D(20) | 26.310 | 9.374 | 7.532 |
| D(25) | 8.780 | 8.942 | 1.991 |
| D(28) | 2.945 | 19.719 | 28.513 |

TABLE 36

[FOCAL LENGTH OF EACH LENS GROUP]

| F1 | 73.350 |
|---|---|
| F2 | −11.214 |
| F3 | 65.644 |
| F4 | 28.000 |
| F5 | −40.069 |
| F6 | 135.373 |

TABLE 37

|  |  | EXAMPLE 1 | EXAMPLE 2 | EXAMPLE 3 | EXAMPLE 4 |
|---|---|---|---|---|---|
| CONDITIONAL EXPRESSION (1) | \|m2/F2\| | 5.061 | 5.270 | 4.461 | 3.061 |
| CONDITIONAL EXPRESSION (2) | (β2t/β2w)/(Ft/Fw) | 0.587 | 0.501 | 0.419 | 0.937 |
| CONDITIONAL EXPRESSION (3) | \|β2t\| | 4.238 | 3.899 | 3.136 | 5.513 |
| CONDITIONAL EXPRESSION (4) | \|F4/Ft\| | 0.125 | 0.076 | 0.142 | 0.114 |
| CONDITIONAL EXPRESSION (5) | \|F5/Ft\| | 0.090 | 0.079 | 0.115 | 0.081 |
| CONDITIONAL EXPRESSION (6) | TTL/Ft | 0.562 | 0.503 | 0.629 | 0.578 |

|  | EXAMPLE 5 | EXAMPLE 6 | EXAMPLE 7 | EXAMPLE 8 | EXAMPLE 9 |
|---|---|---|---|---|---|
| CONDITIONAL EXPRESSION (1) | 3.078 | 3.052 | 4.061 | 4.191 | 4.241 |
| CONDITIONAL EXPRESSION (2) | 0.898 | 1.000 | 0.554 | 0.608 | 0.498 |
| CONDITIONAL EXPRESSION (3) | 5.241 | 5.932 | 3.592 | 3.855 | 3.075 |
| CONDITIONAL EXPRESSION (4) | 0.118 | 0.113 | 0.103 | 0.112 | 0.120 |
| CONDITIONAL EXPRESSION (5) | 0.090 | 0.081 | 0.081 | 0.102 | 0.172 |
| CONDITIONAL EXPRESSION (6) | 0.599 | 0.559 | 0.645 | 0.667 | 0.688 |

According to the present invention, it is possible to provide a compact variable magnification optical system and an image pickup apparatus having a high zooming ratio and good optical performance over the whole zooming range.

What is claimed is:

1. A variable magnification optical system comprising, in order from an object side:
   a first lens group having positive refractive power;
   a second lens group having negative refractive power;
   a third lens group having positive refractive power;
   a fourth lens group having positive refractive power; and
   a following lens group, wherein
   at least the second lens group is moved so that a gap between the first lens group and the second lens group increases and a gap between the second lens group and the third lens group decreases when zooming from a wide angle end to a telephoto end, and
   a conditional expression (1) and a conditional expression (2) are satisfied:

$$3.0 < |m2/f2| < 12.0 \tag{1}$$

$$0.45 < (\beta 2t/\beta 2w)/(Ft/Fw) < 1.0 \tag{2}$$

where
m2 is a movement amount of the second lens group in an optical axis direction when zooming from the wide angle end to the telephoto end,
f2 is a focal length of the second lens group,
β2w is a lateral magnification of the second lens group at the wide angle end,
β2t is a lateral magnification of the second lens group at the telephoto end,
Fw is a focal length of the whole variable magnification optical system at the wide angle end, and
Ft is a focal length of the whole variable magnification optical system at the telephoto end.

2. The variable magnification optical system according to claim 1, wherein
a conditional expression (3) is satisfied:

$$3.0 < |\beta 2t| < 9.0. \tag{3}$$

3. The variable magnification optical system according to claim 1, wherein
when zooming from the wide angle end to the telephoto end, the first lens group is fixed in the optical axis direction and the second lens group is moved toward an image side.

4. The variable magnification optical system according to claim 1, wherein
a conditional expression (4) is satisfied:

$$0.08 < |f4/Ft| < 0.3 \tag{4}$$

where
f4 is a focal length of the fourth lens group.

5. The variable magnification optical system according to claim 1, further comprising:
a fifth lens group disposed at the most object side of the following lens group, wherein
a conditional expression (5) is satisfied:

$$0.08 < |f5/Ft| < 0.3 \tag{5}$$

where
f5 is a focal length of the fifth lens group.

6. The variable magnification optical system according to claim 1, wherein
the following lens group includes a fifth lens group having negative refractive power and a sixth lens group having positive refractive power in order from the object side.

7. The variable magnification optical system according to claim 1, wherein
when zooming from the wide angle end to the telephoto end, the fourth lens group is moved.

8. The variable magnification optical system according to claim 1, wherein when zooming from the wide angle end to the telephoto end, a fifth lens group disposed on the most object side of the following lens group is moved.

9. The variable magnification optical system according to claim 1, wherein the third lens group includes an aperture stop, and when zooming from the wide angle end to the telephoto end, the third lens group and the aperture stop are fixed in the optical direction.

10. The variable magnification optical system according to claim 1, wherein the variable magnification optical system includes an aperture stop, and at least one lens group among the lens groups disposed on the image side in relation to the aperture stop is moved in the optical axis direction in order to focus on a close object from infinity.

11. The variable magnification optical system according to claim 1, wherein a conditional expression (6) is satisfied:

$$0.3 < TTL/Ft < 0.8 \qquad (6)$$

where

TTL is a whole length of the whole variable magnification optical system at the telephoto end.

12. An image pickup apparatus comprising:

the variable magnification optical system according to claim 1; and an image sensor disposed on an image side of the variable magnification optical system and converting an optical image formed by the variable magnification optical system into an electric signal.

* * * * *